(12) United States Patent
Kriza et al.

(10) Patent No.: US 7,769,629 B1
(45) Date of Patent: Aug. 3, 2010

(54) SYSTEM AND METHOD FOR PROVIDING HIERARCHICAL REPORTING FOR ONLINE INCENTIVE PROGRAMS

(75) Inventors: George Kriza, Willow Springs, IL (US); Travis Kriza, Willow Springs, IL (US)

(73) Assignee: Marketing Technology Concepts, Inc., Schaumburg, IL (US)

( * ) Notice: Subject to any disclaimer, the term of this patent is extended or adjusted under 35 U.S.C. 154(b) by 1454 days.

(21) Appl. No.: 10/252,468

(22) Filed: Sep. 23, 2002

(51) Int. Cl.
*G06Q 30/00* (2006.01)

(52) U.S. Cl. ............. 705/14.16; 705/14.12; 705/14.27; 705/14.28; 705/14.29; 705/14.31; 705/14.32; 705/14.33; 705/14.53; 705/14.56; 379/265.06; 434/65; 700/108; 700/174; 702/182

(58) Field of Classification Search ............. 705/14, 705/10, 14.16, 14.2, 14.27, 14.28, 14.29, 705/14.31, 14.32, 14.33, 14.53, 14.56; 379/265.06; 434/65, 238; 700/108, 174; 702/182; 364/551.01
See application file for complete search history.

(56) References Cited

U.S. PATENT DOCUMENTS

| | | | | |
|---|---|---|---|---|
| 5,025,372 | A * | 6/1991 | Burton et al. | 705/14 |
| 5,056,019 | A * | 10/1991 | Schultz et al. | 705/14 |
| 5,500,513 | A * | 3/1996 | Langhans et al. | 235/380 |
| 5,537,314 | A * | 7/1996 | Kanter | 705/14 |
| 5,592,376 | A * | 1/1997 | Hodroff | 705/14 |
| 5,774,870 | A * | 6/1998 | Storey | 705/14 |
| 5,794,210 | A * | 8/1998 | Goldhaber et al. | 705/14 |
| 5,870,724 | A * | 2/1999 | Lawlor et al. | 705/42 |
| 5,915,244 | A * | 6/1999 | Jack et al. | 705/14 |
| 6,000,608 | A * | 12/1999 | Dorf | 235/380 |
| 6,009,412 | A * | 12/1999 | Storey | 705/14.27 |
| 6,009,415 | A * | 12/1999 | Shurling et al. | 705/35 |
| 6,049,779 | A * | 4/2000 | Berkson | 705/14 |
| 6,061,660 | A * | 5/2000 | Eggleston et al. | 705/14 |
| 6,105,001 | A * | 8/2000 | Masi et al. | 705/14 |
| 6,189,787 | B1 * | 2/2001 | Dorf | 235/380 |
| 6,195,644 | B1 * | 2/2001 | Bowie | 705/14 |
| 6,292,569 | B1 * | 9/2001 | Shear et al. | 380/255 |
| 6,424,951 | B1 * | 7/2002 | Shurling et al. | 705/14 |
| 6,651,055 | B1 * | 11/2003 | Kilmer et al. | 1/1 |
| 6,678,250 | B1 * | 1/2004 | Grabelsky et al. | 370/241 |
| 6,751,650 | B1 * | 6/2004 | Finch et al. | 709/203 |
| 6,820,061 | B2 * | 11/2004 | Postrel | 705/14 |
| 7,031,945 | B1 * | 4/2006 | Donner | 705/64 |
| 7,054,830 | B1 * | 5/2006 | Eggleston et al. | 705/14 |

(Continued)

OTHER PUBLICATIONS

Guglielmo, Connie, "Netcentives Takes Its Service to Work" May 24, 1999, Inter@ctive Week, vol. 6, Issue 21.*

(Continued)

*Primary Examiner*—James W Myhre
*Assistant Examiner*—Adam Chornesky
(74) *Attorney, Agent, or Firm*—Patzik, Frank & Samotny, Ltd.

(57) ABSTRACT

A system and method for providing online incentive programs that allows participants in the programs to access hierarchical reports detailing the current status of the incentive programs. The incentive programs include means to restrict access to the various hierarchical reports to prevent the different levels of management from accessing information relating to higher levels of management. Participants may therefore monitor their performance, as well as the performance of those individuals who are under their control.

34 Claims, 29 Drawing Sheets

U.S. PATENT DOCUMENTS

| | | | | |
|---|---|---|---|---|
| 7,102,998 | B1* | 9/2006 | Golestani | 370/235 |
| 7,200,571 | B1* | 4/2007 | Jenniges et al. | 705/37 |
| 2001/0007098 | A1* | 7/2001 | Hinrichs et al. | 705/14 |
| 2001/0007099 | A1* | 7/2001 | Rau et al. | 705/26 |
| 2002/0046091 | A1* | 4/2002 | Mooers et al. | 705/14 |
| 2002/0169671 | A1* | 11/2002 | Junger | 705/14 |
| 2003/0200142 | A1* | 10/2003 | Hicks et al. | 705/14 |
| 2004/0122734 | A1* | 6/2004 | Schleicher et al. | 705/14 |
| 2005/0075926 | A1* | 4/2005 | Liu et al. | 705/14 |
| 2005/0251440 | A1* | 11/2005 | Bednarek | 705/10 |
| 2006/0085532 | A1* | 4/2006 | Chu et al. | 709/223 |

OTHER PUBLICATIONS

Anonymous, "Netcentives lauches @Work incentive program" Jun. 1, 1999, Electronic Advertising & Marketplace, vol. 13 Issue 11, p. 6, 2p.*

Hein, Kenneth, "Online awards.@work" Jul. 1999, Incentive, vol. 173 Issue 7, p. 12, 1p 1c.*

* cited by examiner

| HIERARCHICAL LEVEL | ACCESSIBLE HIERARCHICAL LEVELS |
|---|---|
| Regional Vice Presidents | All |
| District Managers | District managers, territory managers, dealers, salespeople |
| Territory Managers | Territory managers, dealers, salespeople |
| Dealers/Showrooms | Dealers, salespeople |
| Salespeople | Salespeople |

FIG. 7

Reporting
Regional Vice Presidents

| Region | VP | Unit Sales | Claimed Amount | Registrants | Active Participants | | |
|---|---|---|---|---|---|---|---|
| RVP Western Region | RVP 1 | 871 | $18,620.00 | 136 | 40 | Unit Details | Participant |
| RVP Eastern Region | RVP 2 | 1540 | $30,475.00 | 365 | 125 | Unit Details | Participants |
| RVP Central Region | RVP 3 | 2067 | $43,635.00 | 493 | 176 | Unit Details | Participants |
| RVP Region | RVP 4 | 0 | $0.00 | 0 | 0 | Unit Details | Participant |

Choose a section
Home
Rewards
Program Overview

FIG. 9

| Participant | Showroom | City | State | Unit Sales | Bonus Period Unit Sales | Claimed Amount | |
|---|---|---|---|---|---|---|---|
| A | 51 | Tulson | AZ | 0 | 0 | $0.00 | Unit Details |
| B | 52 | Seattle | WA | 0 | 0 | $0.00 | Unit Details |
| C | 53 | Seattle | WA | 0 | 0 | $0.00 | Unit Details |
| D | 54 | Aurora | CO | 0 | 0 | $0.00 | Unit Details |
| E | 55 | Colorado Springs | CO | 0 | 0 | $0.00 | Unit Details |
| F | 56 | Seattle | WA | 0 | 0 | $0.00 | Unit Details |
| G | 57 | Sandy | UT | 3 | 0 | $75.00 | Unit Details |
| H | 58 | Bend | OR | 80 | 0 | $1,960.00 | Unit Details |

FIG. 12

| District | Manager | Unit Sales | Claimed Amount | Registrants | Active Participants | | |
|---|---|---|---|---|---|---|---|
| PACIFIC SOUTH DISTRICT | DM1 | 38 | $790.00 | 3 | 3 | Unit Details | Participants |
| ROCKY MOUNTAIN DISTRICT | DM2 | 129 | $2,245.00 | 56 | 11 | Unit Details | Participants |
| NEVADA DISTRICT | DM3 | 239 | $5,160.00 | 12 | 6 | Unit Details | Participants |
| NORTH CALIFORNIA DISTRICT | DM4 | 157 | $3,375.00 | 13 | 4 | Unit Details | Participants |
| PACIFIC NORTHWEST DISTRICT | DM5 | 376 | $8,175.00 | 53 | 15 | Unit Details | Participants |
| HAWAII | DM6 | 12 | $280.00 | 2 | 1 | Unit Details | Participants |

FIG. 15

| Choose a section | Territory | Manager | Unit Sales | Claimed Amount | Registrants | Active Participants | | |
|---|---|---|---|---|---|---|---|---|
| Home | Arizona | TM1 | 7 | $75.00 | 13 | 2 | Unit Details | Participants |
| Rewards | | TM2 | 15 | $195.00 | 6 | 2 | Unit Details | Participants |
| Program Overview | Arizona | TM3 | 17 | $180.00 | 5 | 2 | Unit Details | Participants |
| | | TM4 | 3 | $75.00 | 10 | 1 | Unit Details | Participants |
| | Colorado | TM5 | 9 | $200.00 | 9 | 1 | Unit Details | Participants |
| | | TM6 | 0 | $0.00 | 0 | 0 | Unit Details | Participants |
| | New Mexico/El Paso | TM7 | 98 | $1,520.00 | 9 | 3 | Unit Details | Participants |
| | | TM8 | 3 | $0.00 | 1 | 0 | Unit Details | Participants |
| | Rocky Mountain | | 0 | $0.00 | 0 | 0 | Unit Details | Participants |

| | | | | | | |
|---|---|---|---|---|---|---|
| | ...South | TM9 | 0 | $0.00 | 0 | Unit Details Participants |
| | ...South | TM10 | 0 | $0.00 | 0 | Unit Details Participants |
| | ...South | TM11 | 3 | $0.00 | 0 | Unit Details Participants |
| ROCKY MOUNTAIN DISTRICT | | | 159 | $2,345.00 | 55 | 11 Unit Details Participants |
| | ...ona | TM1 | 7 | $75.00 | 13 | Unit Details Participants |
| | ...ona | TM2 | 15 | $195.00 | 6 | Unit Details Participants |
| | ...ona | TM3 | 17 | $130.00 | 5 | Unit Details Participants |
| | Colorado | TM4 | 3 | $75.00 | 17 | Unit Details Participants |
| | Colorado | TM5 | 7 | $200.00 | 4 | Unit Details Participants |
| | Colorado | TM6 | 0 | $0.00 | 0 | Unit Details Participants |
| | New Mexico, El Paso | TM7 | 30 | $1,620.00 | 3 | Unit Details Participants |
| | New Mexico/E... | TM8 | 0 | $0.00 | 1 | Unit Details Participants |
| | Rocky Mountain | | 0 | $0.00 | 0 | Unit Details Participants |

FIG. 2/A

Participants

Gateway to Performance

- View Claims
- Card Information

Claim Summary

Filter By Date
From 5/14/2002
To 06/14/2002
[View Claim Summary]

Card Statement

Filter By Date
From 5/14/2002
To 06/14/2002
[View Card Statement]

To view a specific time frame, input window of time and select Filter by Date or to view all, simply click the button to proceed to a complete viewing of your statement information.

LogOut

FIG. 28

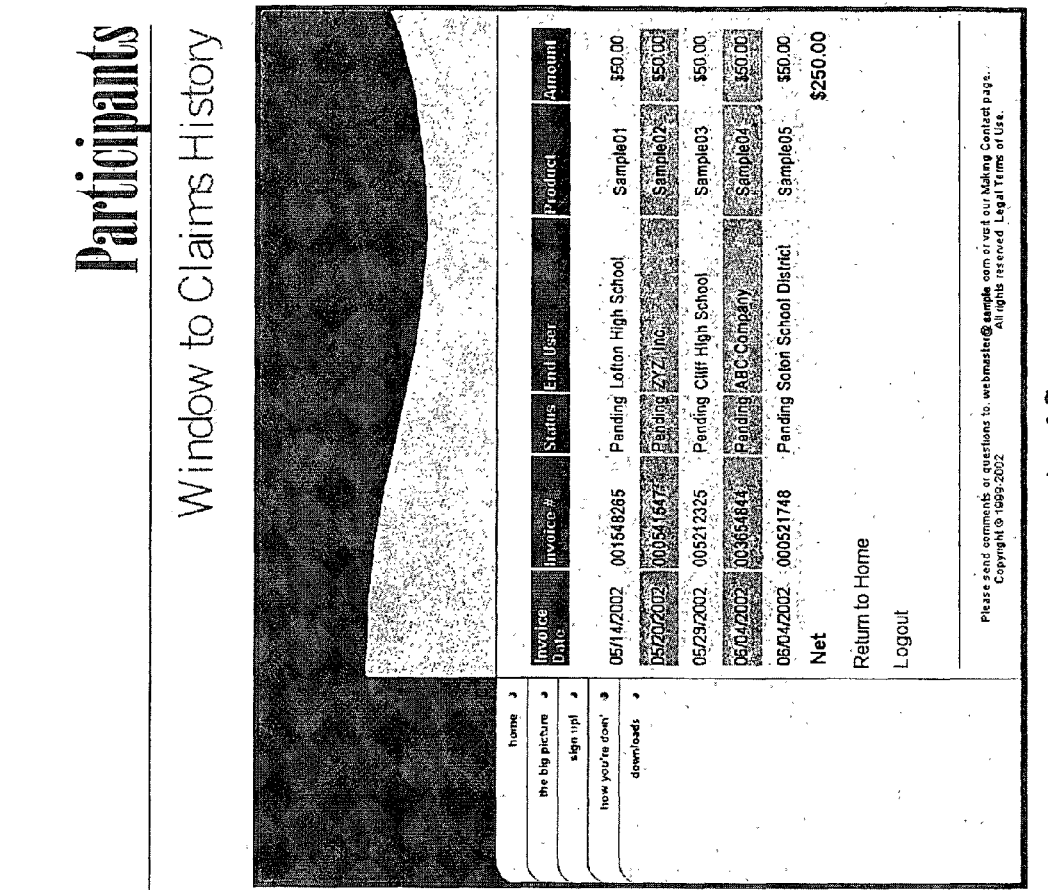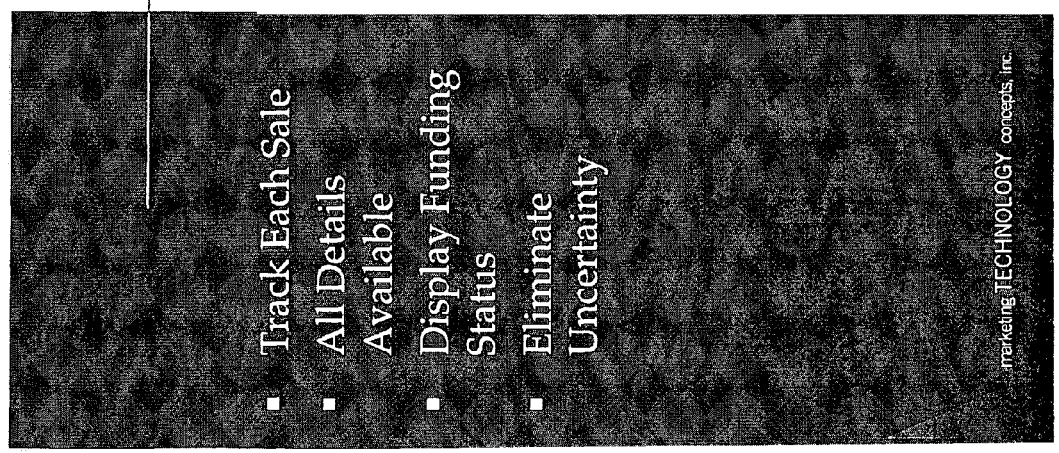
FIG. 29

Participants

Purchase History

| Transactions Starting | Ending Date | Previous Balance | New Balance |
|---|---|---|---|
| | | $0.00 | $12.60 |

| Date | Description | Amount |
|---|---|---|
| 05/23/2002 | Purchase VANS SBAY GALLERIA # | $51.94 |
| 05/23/2002 | ValueLoad | $200.00 |
| 05/30/2002 | Purchase LINDBERG NUTRITION SKY | $11.99 |
| 05/30/2002 | Purchase SUPERCUTS - CA020 | $-12.00 |
| 05/31/2002 | Purchase TOMMY'S 1 HOUR CLEANER | $19.28 |
| 06/01/2002 | Purchase BEST BUY 00001040 | $-48.15 |
| 06/06/2002 | Purchase EXXONMOBIL3410120623410 | $30.00 |
| 06/11/2002 | Purchase RALPHS #0120 SF4 | $-12.77 |
| 06/13/2002 | Purchase NIKE0COM | $2.76 |
| | | $0.00 |

Return to Home
Logout

- Current Balance Available
- Privacy Protected marketing TECHNOLOGY concepts, inc

FIG 30

SYSTEM AND METHOD FOR PROVIDING HIERARCHICAL REPORTING FOR ONLINE INCENTIVE PROGRAMS

FIELD OF THE INVENTION

This invention relates in general to incentive programs, and more particularly to a system and method for monitoring the status of incentive programs online, and still more particularly to a system and method for remotely providing hierarchical reporting for online incentive programs via the Internet or a network.

BACKGROUND OF THE INVENTION

Employers or companies often provide incentive programs to encourage employees or vendors to increase their effort to sell certain products or services. Incentive programs operate under several principles. One of the principles behind incentive programs is that by allowing other employees at the same level to see how fellow employees and/or competitors are doing, the employee is encouraged to match or beat the achievements of his or her fellow employees or competitors. Another principle behind incentive programs is that by rewarding a positive act, there is a likelihood that the act would be repeated to the benefit of both the employer and the employee.

Traditional incentive often involved manually inputting information related to the incentive program and then retaining hard copies of the compiled information. While such programs may work, several problems have arisen during their operation. Notably, such programs often involved a significant lag time between the action taken and the incentive reward associated with the action. In other words, in traditional incentive programs, after selling a product that qualifies under the incentive program, the employee would often have to submit a claim that would be manually inputted. Such a process could take several months, thereby diminishing the positive causal relationship between the act of selling the product and the associated reward. Delays in updating reports also inhibit the ability of employees to compare their achievement or progress with other employees, peers or competitors. Additionally, manual inputting information and calculating rewards increased the risk of incorrect input or calculations. Likewise, if such systems were computer-based, they were traditionally kept on the computer systems of the employer or the system of the company administering the incentive program. Accordingly updates and/or modifications typically had to be performed by the company administering the program. As a result, access to such information by the participants was often somewhat restricted or the posting of updated information was often delayed.

Because of the above problems, among others, participants in the traditional incentive programs were unable to readily compare how they were doing relative to other participants at their hierarchical level. Additionally, participants were unable to view the compilation of incentive reward information for the employees or participants under their realm of responsibility or command to allow participants to monitor their progress and provide the necessary follow-up to those participants who are not meeting expectations.

Therefore, there is a need for a system and method that allows different levels of management to immediately access information concerning the incentive program with respect to their entire realm of responsibility, while being economical and easy to manufacture and install. There is likewise a need to provide an online system that can be accessed and/or maintained by authorized personnel remotely so as to provide easy access to such up-to-date information and/or provide at least some degree of self-administration.

SUMMARY OF THE INVENTION

The present invention is an improvement over the prior incentive programs in that the way that the incentive program allows different levels of management to view all of the information pertaining to their area of responsibility is unique and an improvement over the prior art. In particular, the incentive program system of the present invention is essentially directed to establishing an online incentive program that allows a plurality of participants to access hierarchical reports of the incentive program in real time to allow the participants to monitor their performance, as well as the performance of the participants under their control, and compare the results to other participants at the same hierarchical levels. The present invention includes a host that manages the incentive program, a company that offers an incentive program and a plurality of participants who participate in the program and have immediate remote access to the hierarchical reports for the incentive program by accessing the Internet web site with the requisite authorization and/or passwords.

In the present invention, companies or other employers establish an online incentive program by communicating with the host or incentive program institution. Eligible participants of the incentive program are listed in hierarchical levels based on the participants' employment levels. Participants may then log onto a computer, connect to the Internet and enter a series of secure Web pages operated by the incentive program institution. Upon registering, the participants will obtain their own password to allow access to various levels of hierarchical reports and other incentive program information. In particular, each participant or user who logs onto the incentive program will be able to access program reports for all of the participants at or below the user's employment level. Included in the reports will be a compilation of the incentive program status of each of the participants. The incentive status may include, in addition to the personal information about the particular participant, a list of all transactions which qualify for an incentive reward, the dates of those transactions, and the products involved. Additionally, the information also will include a summary of the participants who are within the realm of responsibility of any of the participants. The users may therefore check the performance status for all of their employees and/or compare their performance against that of their peers.

Once the incentive program is established, participants may log on to enter transactions that qualify under the incentive program. Upon validation of the transaction, the reward may be instantly inputted to allow for it to be viewed through the web page. Debit cards may be issued to the participants to allow for the incentive program institution to credit the debit cards upon validation of an incentive reward. By being able to immediately view a posting of their claims and by receiving their rewards shortly after performing the encouraged transaction, the participants will therefore be reminded of the program and encouraged to continue to perform the desired transactions to achieve rewards.

It is therefore an object of the present invention to provide a new and improved system and method for incentive programs in an online environment that allows the participants to track their progress in real time, whereas, the inquiry and substantive response appear to be virtually instantaneous to the user, to stimulate participation in the incentive program.

Another object of the present invention is to provide a system and method that empowers each level of management to better understand and manage their area of responsibility, in an Internet-accessible environment.

A still further object of the present invention is to provide information to the various levels of management to allow for the employees to easily monitor the participants and product sales involved in the incentive program and access the incentive program from virtually any computer having Internet access.

A still yet further object of the present invention is to provide a system and method that provides information regarding various aspects of an incentive program to various levels of management in real time, remotely.

A still further object of the present invention is to provide controlled access to information regarding an incentive program to allow various levels of management to remotely access only the information pertaining to particular levels of management, while still making it possible to provide separate access to each hierarchical position or level, so that access is not restricted to a single access account per position or level.

Other objects, features and advantages of the invention will be apparent from the following detailed disclosure, taken in conjunction with the accompanying sheets of drawings, wherein like reference numerals refer to like parts.

BRIEF DESCRIPTION OF THE DRAWINGS

FIG. 7 is a chart illustrating the levels of access of hierarchical reports available to the various management levels of one embodiment of an employment structure.

FIG. 9 is an embodiment of a screen shot of a Web page of the present invention that shows a hierarchical report for an online incentive program depicting the various regional vice presidents of a company.

FIG. 12 is an embodiment of a screen shot of a Web page of the present invention depicting all of the individual participants under the responsibility of one of the regional vice presidents.

FIG. 15 is an embodiment of a screen shot of a Web page of the present invention that depicts a listing of district managers that are under the responsibility of one of the regional vice presidents.

FIG. 16 is an embodiment of a screen shot of a Web page of the present invention showing a listing of territory managers that are under the responsibility of one of the district managers.

FIG. 17 is an embodiment of a screen shot of a Web page of the present invention that shows a listing of companies that are under the responsibility of one of the territory managers.

FIG. 18 is an embodiment of a screen shot of a Web page of the present invention that illustrates a list of individual participants for showrooms that are under the responsibility of one of the companies.

FIG. 19 is an embodiment of a screen shot of a Web page of the present invention illustrating a listing of the district managers participating in the incentive program.

FIG. 21A is an embodiment of a screen shot of a Web page of the present invention depicting a listing of the territory managers participating in the incentive program.

FIG. 28 is an embodiment of a screen shot including a Web page of the present invention showing data entry fields for requesting a claim summary or a card statement.

FIG. 29 is an embodiment of a screen shot including a Web page of the present invention that illustrates an example of a claim summary.

FIG. 30 is an embodiment of a screen shot including a Web page of the present invention depicting an example of a card statement.

DETAILED DESCRIPTION OF THE INVENTION

Figure 1:
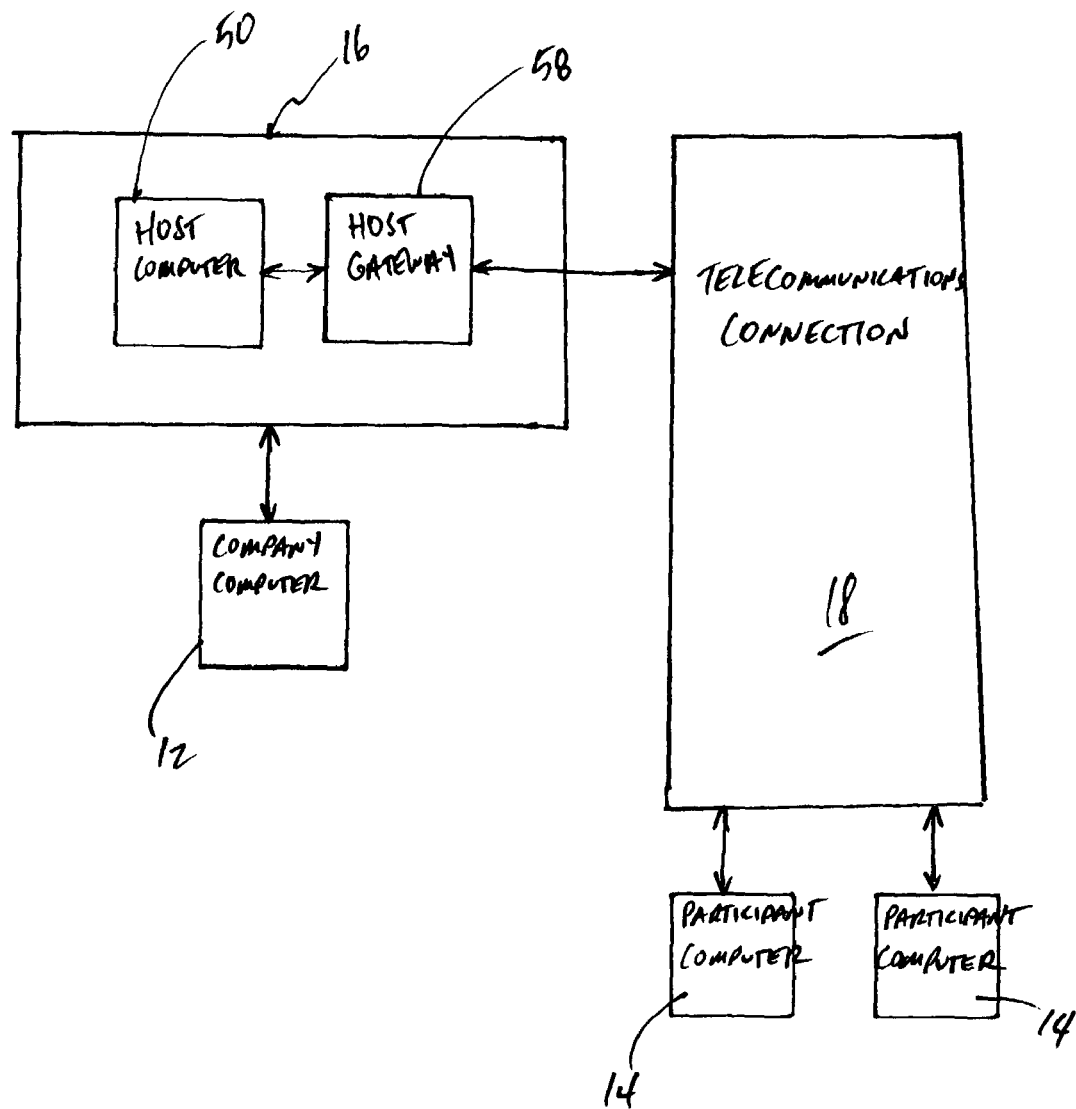
FIG. 1 is a schematic diagram of the primary components of the hardware components of the host system of the present invention.

While this invention is susceptible of embodiment in many different forms, there is shown in the drawings and will herein be described in detail several specific embodiments, with the understanding that the present disclosure is to be considered merely an exemplification of the principles of the invention and the application is limited only to the appended claims.

The system includes a host or incentive program institution that manages the system, a company or entity that offers an incentive program and a plurality of participants who participate in the incentive program. Referring now to the drawings, and particularly to FIG. 1, there is shown a preferred embodiment of the present invention. The incentive program system, generally designated by the number 10, is shown as having a company computer 12 and a plurality of participant computers 14 connected to a host system 16 by a telecommunications connection 18 over the Internet. Although the Internet is the preferred medium of communications, it is appreciated that the invention may be operated over an Intranet within the company and not depart from the scope of the present invention. It is further appreciated that the participants may encompass any individual or user who is eligible, to participate in the incentive program including, but not limited to, employees of the company and third parties such as partners, distributors and/or retailers.

Figure 2:
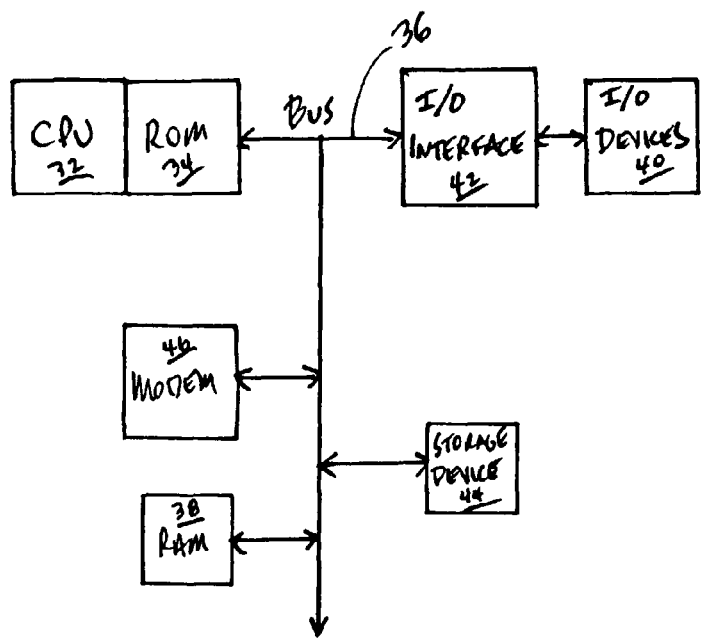
FIG. 2 is a schematic diagram of a computer for use with the present invention.
Figure 3:
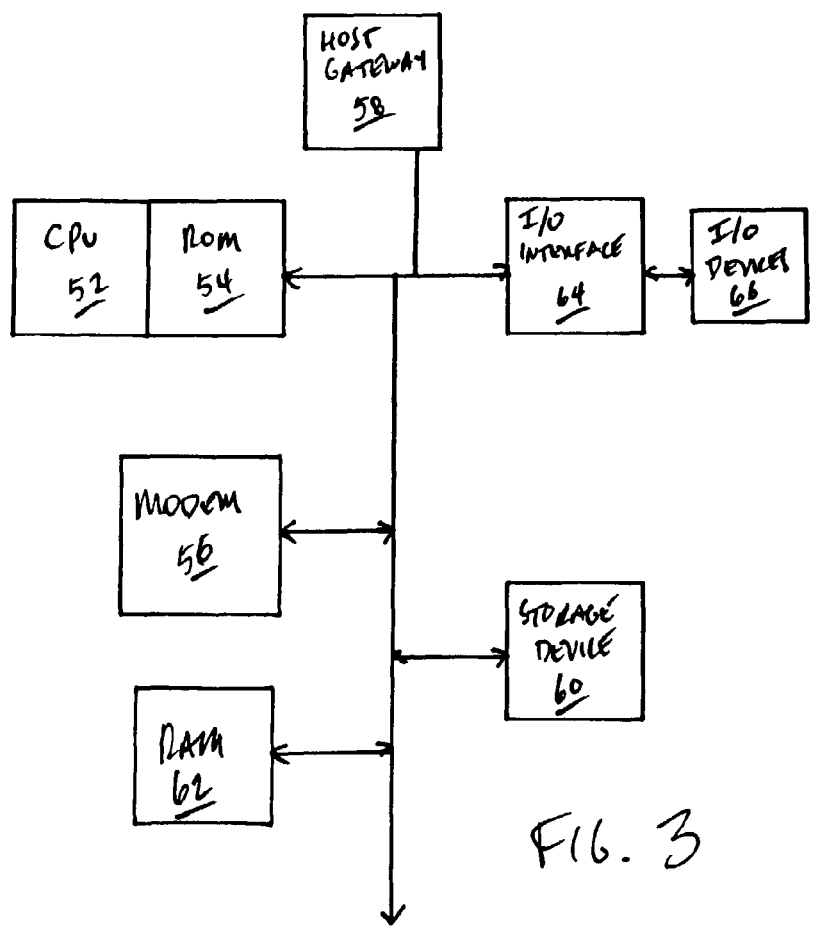
FIG. 3 is a schematic diagram of a host computer for use with the present invention.

It is appreciated that the various computers may comprise any computer having the known components necessary to participate in the present system. For example, referring to FIG. 2, the participant and employee computers 12, 14 may include a central processing unit (CPU) 32 and associated read-only memory (ROM) 34, both of which are connected along data and address bus lines 36 to a random access memory (RAM) 38. An input/output (I/O) device 40, an I/O interface 42, a data storage device 44 and a modem 46 may be connected to the RAM 38, CPU 32 and the ROM 34 in a known way. The CPU 32 is operatively connected to the I/O interface 42 to control any corresponding I/O devices 40 such as, but not limited to, keyboards, mice or joysticks. The computers also include an operating system (not shown) that controls various applications including, but not limited to, data management, storage and retrieval, web browsing applications and communication applications that allow the computer to communicate with other computers over the Internet. The operating system may be any standard operating system such as, but not limited to, Windows 98.

The host system 16 may include a host computer 50 that includes a CPU 52, ROM 54, modem 56, a host gateway 58, a data storage device 60, RAM 62, I/O interface 64 and I/O device 66. The host system also may include an HTTP server, or web server, and a separate application server capable of communication to the HTTP server. While the host computer preferably includes a host gateway, it is appreciated that it may be configured to provide a direct connection to the telecommunications connection.

Figure 4:
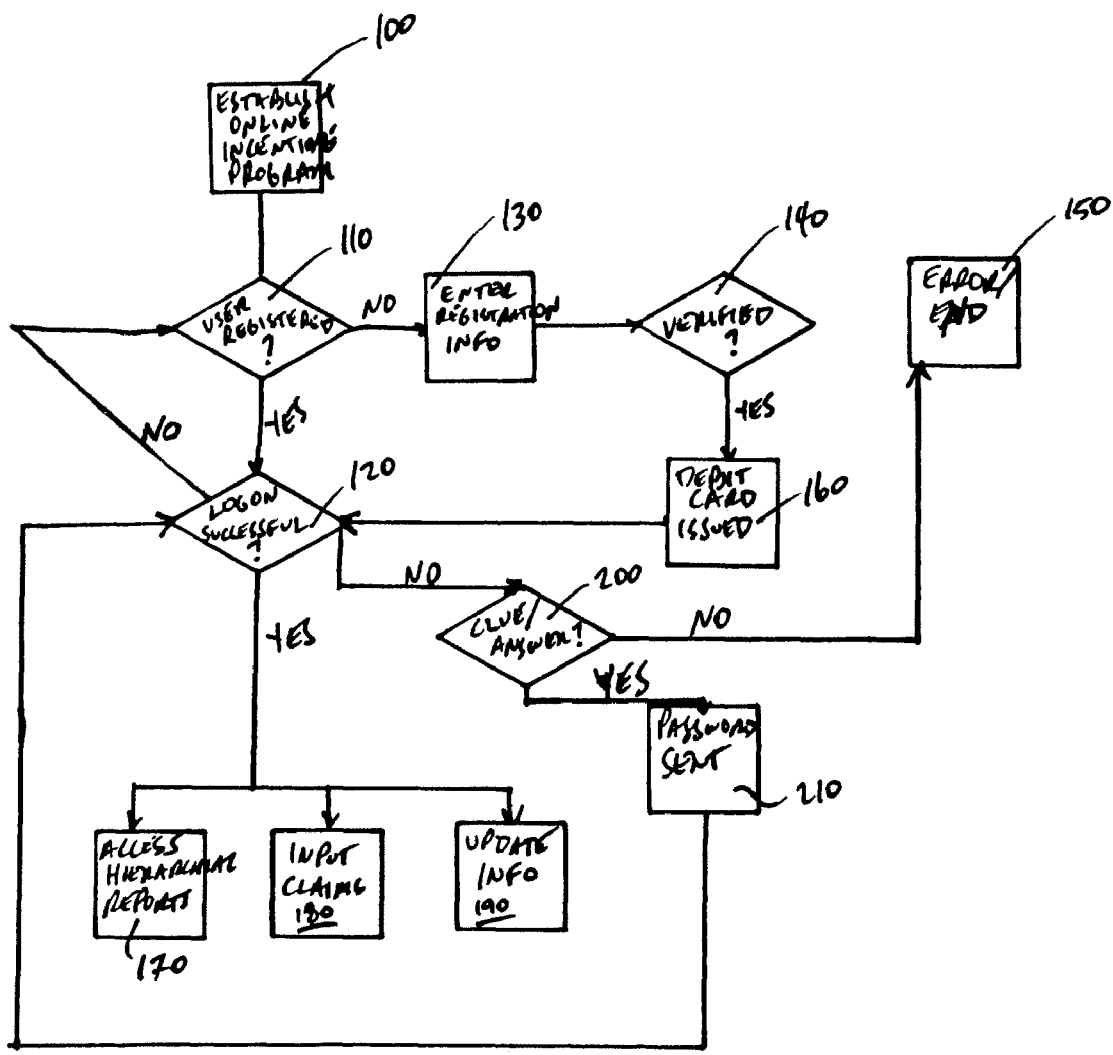
FIG. 4 is a flow chart depicting the steps for allowing a participant to participate in an incentive program that offers hierarchical reporting.

FIG. 4 details the steps involved in providing hierarchical reports for an online incentive program. In step 100, a company or other entity establishes an incentive program for posting on a series of Web pages on the company's own server or through a incentive program institution. If an incentive program institution is utilized to assist in establishing and operating the incentive program, the company may access a series of Web pages (not shown) that provide a series of prompts or data entry fields to assist the company in creating a particular incentive program. Alternatively, the company may send the particular information pertaining to the incentive program through other media, such as, but not limited to, facsimiles or E-mail, to the institution to enable the institution to create the desired incentive program.

Information necessary to establish an incentive program will vary depending on the type of incentive program. Basic information required for most incentive programs includes, but is not limited to: the hierarchical structure of the company; a list of all eligible participants in the program and their relative position in the hierarchical structure of the company; and a list of all products or services that qualify for a reward under the incentive program.

Once the incentive program is operating online, potential registrants (i.e., participants or users) may access the incentive program through a series of secure Web pages operated by the institution, company or other entity. The online incentive program preferable includes user restricting means for ensuring that only eligible participants access the program and for preventing the eligible participants from accessing hierarchical reports above their employment level. For example, the system is preferably adapted to require a participant to enter a user name and password to log onto the incentive program. Once logged in, the user will only be allowed to access those reports and other information that are associated with the user's hierarchical level or otherwise designated as accessible by a particular user. Thus, participants at a lower hierarchical level would be unable to access information pertaining to the higher hierarchical levels if so desired.

Once the Web pages are accessed, the program will preferably prompt the user to input whether it is a registered user in step 110. If the user is already a registered user, the user may proceed to log on by inputting the user's designated user name and password to access the particular incentive program in step 120. In addition to prompting for the user name and password, the log on screen may also include a prompt for selecting the desired incentive program. However, it is appreciated that the particular incentive program may be selected from a separate Web page, or be associated with the particular user in a known way.

Figure 5:
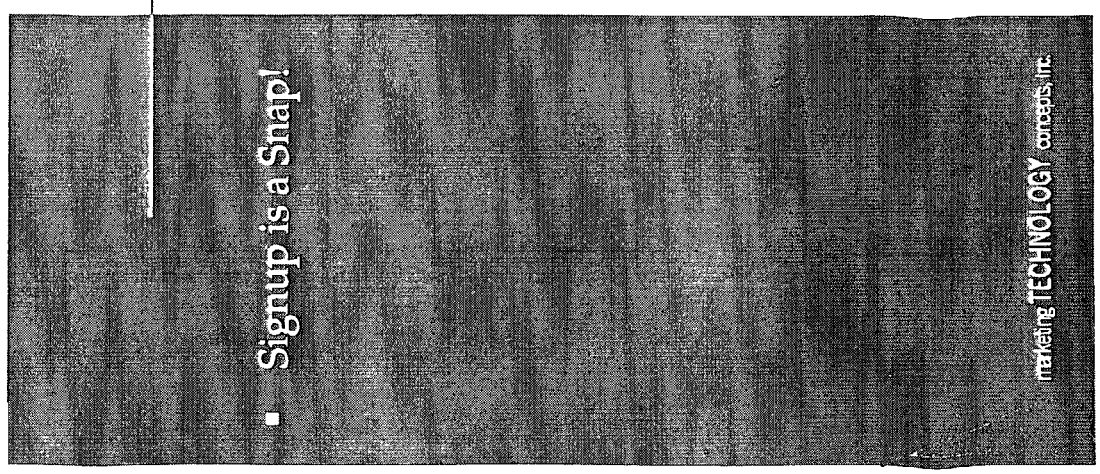
FIG. 5 is an embodiment of a screen shot of a Web page of the present invention depicting data entry fields for registering to participate in an incentive program.

If the user is not already registered, the user will be prompted to enter registration information in step 130. An example of a Web page for inputting registration information through a series of data entry fields is shown in FIG. 5. Included among the data entry fields are a series of fields for inputting the participant's name, social security number, a password, home address, employer information and contact information such as a telephone number and an E-mail address. To assure that the password is correctly entered, the participant may be prompted to re-enter the password. If the password is not correctly repeated, an error message will be displayed indicating that the passwords did not match and needs to be reentered. Additionally, in case the user forgets the password, the user may be asked to select a particular security question such as the user's birthday or pet's name and then provide an answer. It is appreciated that information regarding the participants may be imported and converted from data files stored in any number of formats such as, but not limited to, in an Excel spreadsheet, for inputting into the system.

Once the user completes the registration information, the institution will compare the information against the participant list provided by the company in step 140 to determine if the user is eligible to participate in the incentive program. If the user is not verified, an error message will be shown and the registration proceedings will end in step 150. The user may thereafter attempt to register again or contact the institution for assistance. On the other hand, if the participant is verified in step 140, the user may be issued a debit card for use with the incentive program in step 160 and proceed to log on to access the incentive program at step 120.

The variable reporting information that can be provided with the debit card example includes: the amount claimed (e.g., by total, by month, within a date range and/or by hierarchical level); the amount paid (e.g., by total, by month, within a date range and/or by hierarchical level); the products claimed (e.g., by total, by month, within a date range and/or by hierarchical level); the products paid (e.g., by total, by month, within a date range and/or by hierarchical level); the registrations (e.g., by total, by date range and/or by hierarchical level); and/or the participant information (e.g., claims made and/or claims paid by total, by month, within a date range or the like). In addition, other information such as that requested by a customized or tailored focus of reporting to meet the company's needs or to serve as part of its business intelligence.

While a debit card for providing cash rewards is preferred, it is appreciated that other methods of providing rewards, including, but not limited to, checks or gift certificates, may be used. Additionally, it is appreciated that the debit card may be distributed to the participants at any point during the incentive program with any accrued amounts being loaded on the card when distributed. The system also allows the company to selectively offer overlay promotions or specials. In order to offer the special, the company specifies the requirements for participating in the special. Participants thereafter meeting such criteria then automatically receive such special benefit or award. Participation in the special may be limited in any number of ways, including, but not limited to, by hierarchical level by date, by particular products, or to certain participants. The specials are preferably associated with the user name and password in a known way to automatically inform the user of any specials upon successfully logging onto the system.

Preferably, the company will inform the incentive program institution when establishing the program of the minimum reward amount that must be accrued by a participant before debit cards may issue. If the company selects $0 as the minimum amount, the debit cards may be distributed to the participants immediately after the registration process is complete. Similarly, if the company selects a minimum reward such as $100, then the cards will not be distributed until the participants meet the minimum amount. Furthermore, while a cash reward is disclosed, it is appreciated that the present invention may be used with a wide variety of incentive program rewards, including, but not limited to, travel vouchers, rebate programs, payroll items, train tickets, restaurant certificates, gift certificates, paid vacation time, rental car certificates, trips, tickets to sporting events or concerts, or merchandise.

Inputting the correct user name and password will allow the participant to access the incentive program and perform a series of operations, including, but not limited to accessing hierarchical reports, inputting claims, or updating their information in steps 170, 180 and 190. If the wrong user name or password is inputted, or if the user cannot remember the correct password, the user may request the correct password to be forwarded, preferably in an E-mail message to the user's E-mail account. Before sending the password, the institution will prompt the user in step 200 to answer the security question entered during the registration process. A successful response to the question will allow the password to be sent to the user in step 210. If the answer is incorrect, an error message will be displayed and the registration process will end in step 150.

Figure 6:
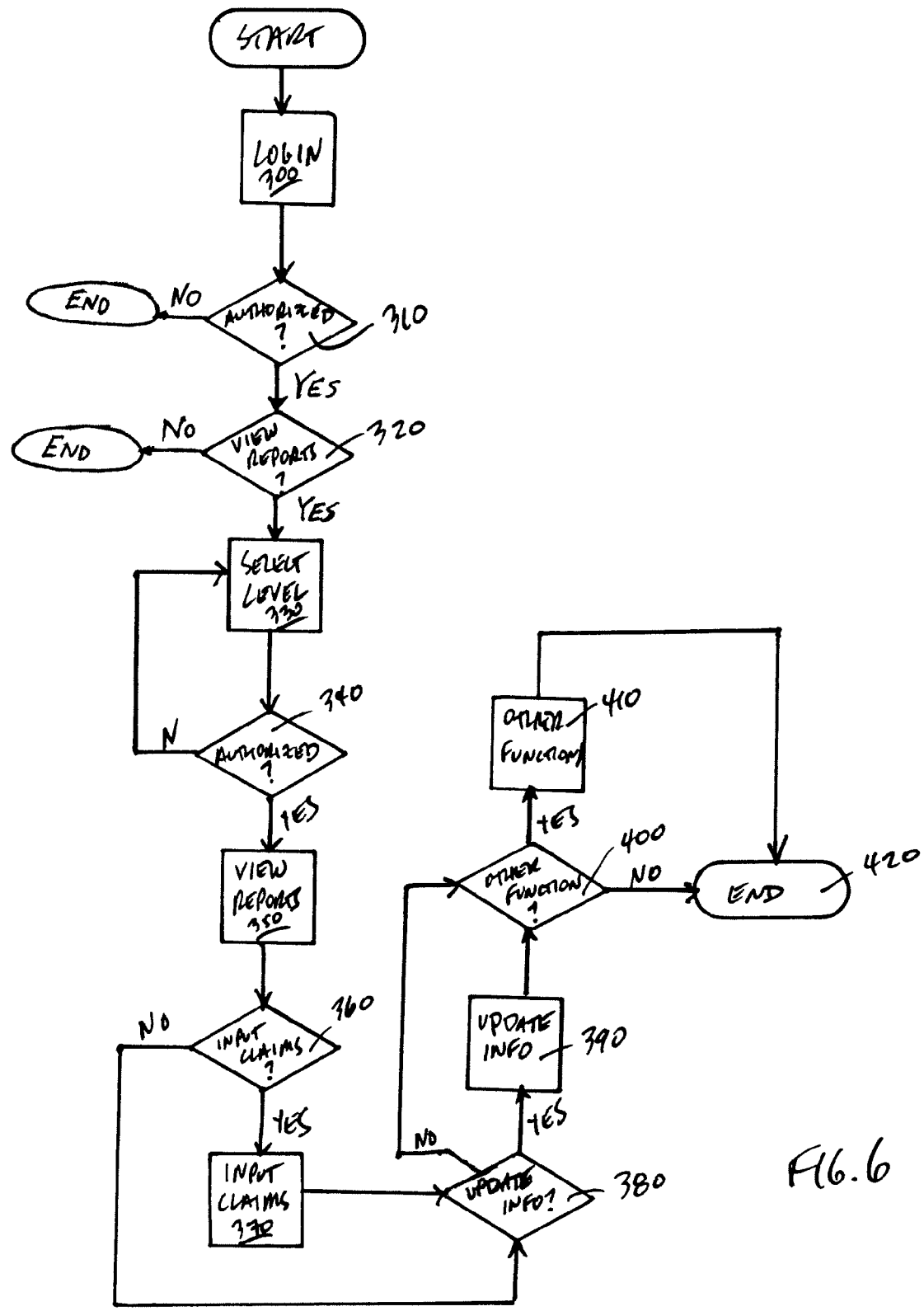
FIG. 6 is a flow chart depicting the steps for allowing a participant to view hierarchical reports for an incentive program.

FIG. 6 details the steps involved for a participant to view hierarchical reports. A participant in an incentive program will log on to the incentive program in step 300. Upon determining whether the participant is authorized to view the incentive program in step 310, the incentive program will display a screen listing the available hierarchical reports in step 320. The participant may then select a hierarchical level in step 330. Once it is determined that the participant is authorized to view the hierarchical level in step 340, the participant may view the hierarchical report in step 350. If it is determined that the participant is not authorized to view the selected hierarchical level, the user will be prompted to select another level in step 330.

Among the links on the Web pages are links to allow the participant to input claims and update information. By selecting the link to input claims in step 360, the participant may thereafter input a claim in step 370. Alternately, by selecting the link to update the participant's information in step 380, the participant may update his or her information. It is appreciated that the participant may select and perform other functions in steps 400 and 410, view additional hierarchical reports in step 350 or input additional claims in 360. While it is shown that the participant views the hierarchical reports before inputting claims or updating information, it is appreciated that the participant may perform one or more of the functions in any order and not depart from the scope of the present invention. Once the participant has completed all desired functions, the participant may thereby log off the incentive program in step 420 to end the connection.

Referring to FIGS. 8 through 20, a series of Web pages illustrating an embodiment of a hierarchical reporting system of the present invention are shown. The Web pages shown and disclosed are provided for illustrative purposes and are not intended to limit the present invention to those particular displays. As indicated above, the participants are listed in a particular hierarchical level based on their employment level. While any number of hierarchical levels may be used with a wide variety of classifications, titles or descriptions, an example of a hierarchical structure includes regional vice-presidents, area directors, district managers, territory managers, dealers/showrooms and salespeople. As shown in the chart in FIG. 7, it is preferred that each of the participants will have access to the hierarchical reports for their own hierarchical level and all lower levels. For example, the regional vice president represents the highest level and therefore may access all of hierarchical reports, while a territory manager may only access the hierarchical reports for the territory managers, dealers and the salespeople.

Additionally, it is appreciated that information may be specially extracted from the hierarchical reports to allow an authorized participant to have access to specifically requested information. For example, the program may extract information pertaining to the top sellers for each hierarchical level to allow a regional vice president to readily track and communicate with the participants. Likewise, the system has the ability to handle special hierarchical situations where, for instance, even though a five-level hierarchy may be in use as a general rule, one individual within the hierarchy handles or manages a group of companies or individuals at various levels in the hierarchy. In that situation, one can request that individual and receive information on all of the companies and individuals for which he is responsible—at all levels of the hierarchy.

Figure 8:
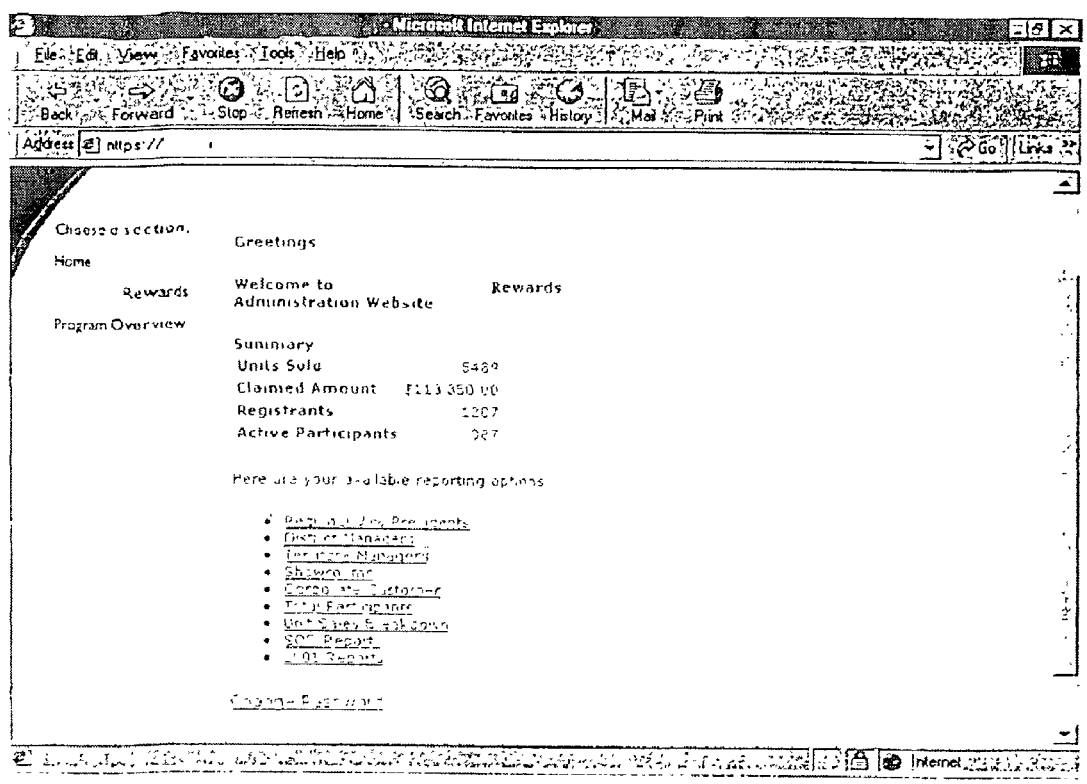
FIG. 8 is an embodiment of a screen shot of a Web page of the present invention illustrating the various reporting options available for an online incentive program.

FIG. 8 depicts an embodiment of an introduction page to an incentive program. The introduction page may include any number of links including, but not limited to, a program overview link for accessing, among other things, the program rules, any news updates for the program and a description of the program. The introduction page also may include information or hypertext links pertaining to the overall success of the program. The information, which may be restricted to only permit access by certain participants or the institution, may include the total units sold, the claimed amount, the number of registrants involved in the incentive program, and the number of participants who are active (i.e., claimed an incentive reward).

The introduction page also preferably includes links for accessing the various hierarchical reports for the incentive program. The example of the incentive program shown in the figures involves the following five levels: regional vice-presidents; district managers; territory managers; showrooms; and total participants. Other links may allow the participant to access the unit sales breakdown to determine which products are selling better in particular regions or showrooms and various other reports including, but not limited to, summaries of claims, monthly summary reports, performance reports, tax reports, and product accounting reports.

FIGS. 8 to 24 show the hierarchical reports accessible by participants at the highest level, or the regional vice-presidents. The reports preferably provide a breakdown of the current records for the particular incentive program. By providing such reports online, the users may access the relevant information pertaining to their respective realms of responsibility and compare their performance to that of their peers. The users may thereafter be able to focus their attention and resources on particular participants or products that are not achieving the desired results or sales.

As shown in FIG. 9, upon determination that the participant has authority to access the regional'vice-presidents reports, selecting the regional vice-presidents hypertext link will display a report including the current records for the incentive program for all the regional vice presidents. In particular, the report may include information such as the total units eligible for the incentive program sold under each regional vice president's command, the total claimed amount of rewards accrued for those sales, and the number of registrants and the number of registrants who are active participants (i.e., claimed an incentive reward). Additionally, the report includes links that allow the regional vice presidents to access the hierarchical reports for the participants at lower hierarchical levels and/or that detail the specific information about the units sold.

As shown, such reporting is available by accessing the web site of the company offering the program or entity that administers it.

Figure 10:
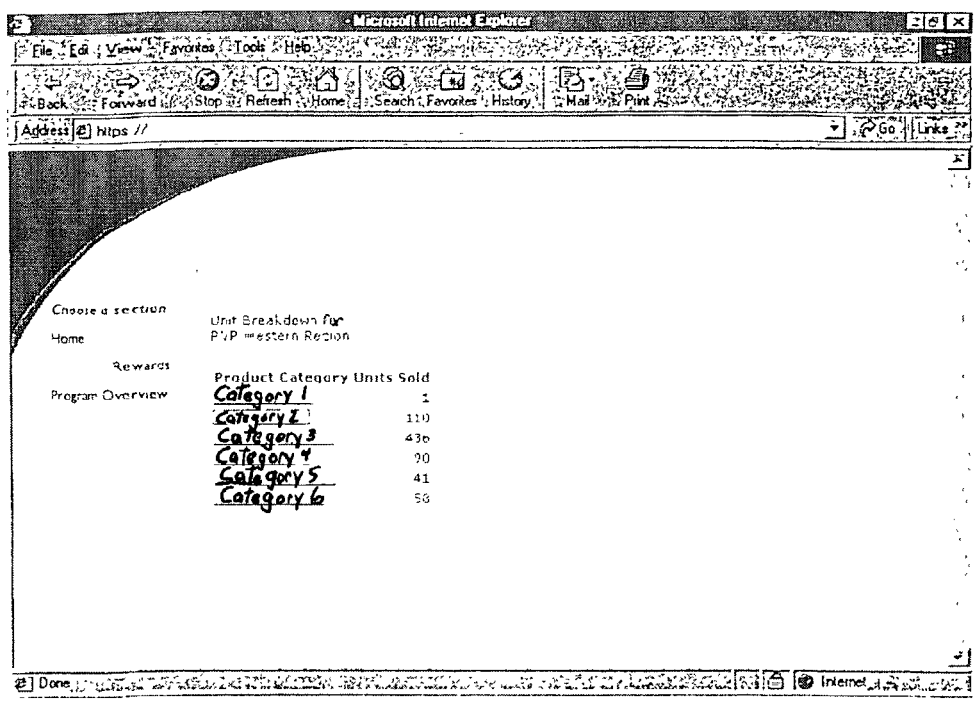
FIG. 10 is an embodiment of a screen shot of a Web page of the present invention that illustrates the unit details broken down by product category for one of the regional vice presidents listed in FIG. 9.

FIG. 10 displays the unit breakdown for the Regional Vice President for the Western Region. The unit breakdown, which may be accessed by clicking on the 'unit details' hypertext link, may include information concerning the product categories and the number of units sold in the respective product categories. The product categories may be listed in a wide variety of ways, including, but not limited to, a particular type of product (e.g., kitchen sinks) or by a brand name.

Figure 11:
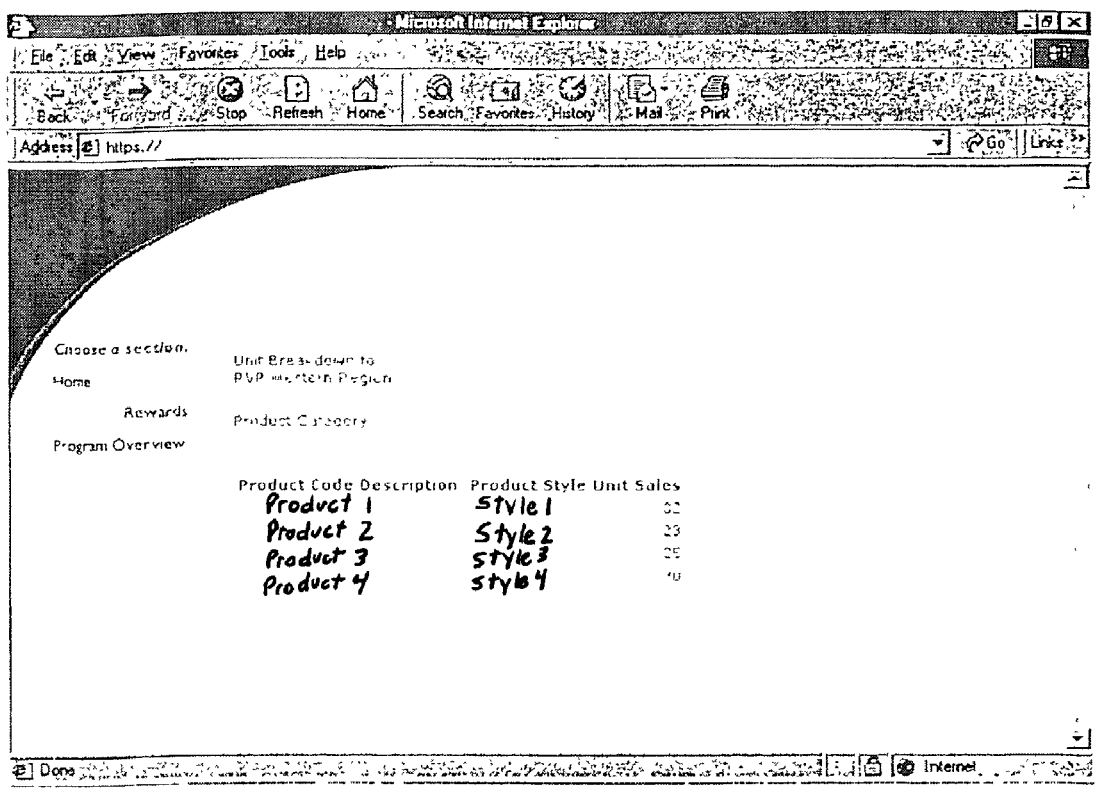
FIG. 11 is an embodiment of a screen shot of a Web page of the present invention that lists the specific products for one of the product categories listed in FIG. 10.

The product categories may further include hypertext links to an additional Web page that details the specific products sold and the respective quantities sold. FIG. 11 shows the particular breakdown of products for the second category of products as including such information as the product code, description, product style and unit sales. The sum of the units listed for each of the product categories is equivalent to the number of products listed for the product category on the prior Web page. While multiple Web pages are preferred for showing the details of the units sold, it is appreciated that the information may be contained on one Web page and not depart from the scope of the present invention.

Referring again to FIG. 9, clicking on the 'participants' hypertext link for the individual regional vice presidents will enable the user to see all of the participants under each regional vice president. For example, clicking on the 'participants' link for the Regional Vice President for the Western Region will lead to a Web page that lists each of the participants in the western region. Additionally, the Web page, as shown in FIG. 12, may also include the showroom or place of employment of the participant; the location of the showroom; the unit sales; and the claimed amount for each participant. The user may then click on the unit details as described above to view the same type of information shown in FIGS. 10 and 11, namely the product category, product code and/or product style. If any of the participants listed on the Web page indicate that they have claimed an incentive bonus, then the participant hypertext link may be selected to view the individual batch records for the particular participant.

Figure 13:
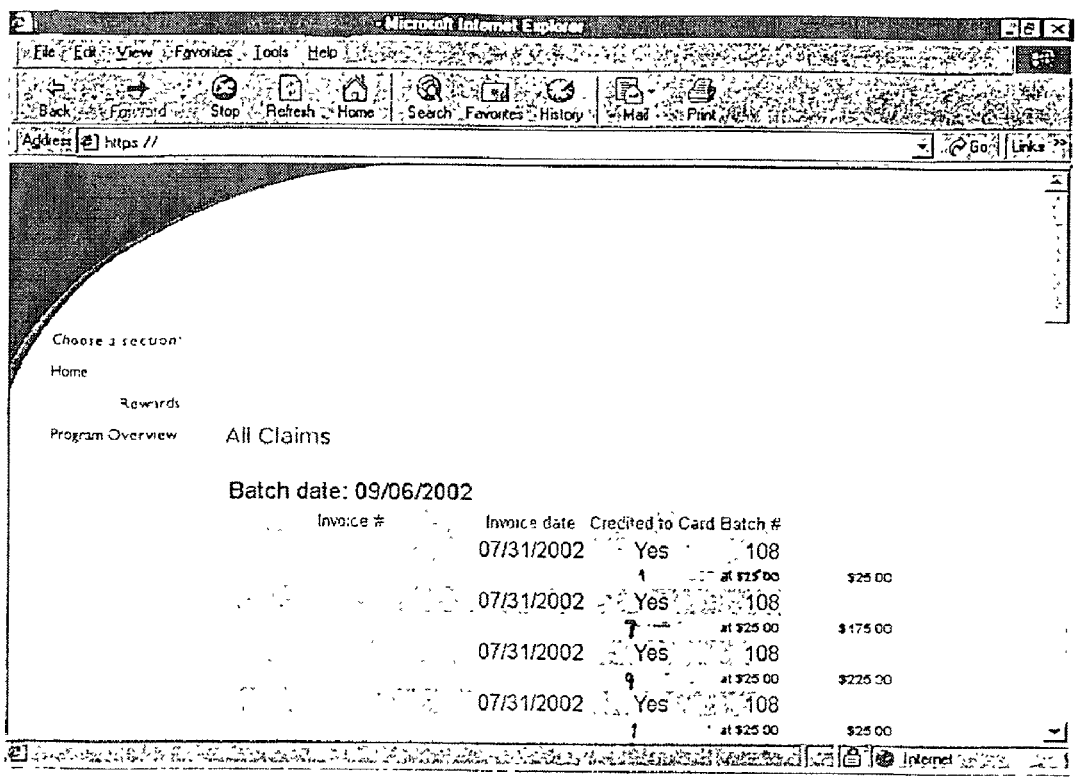
FIG. 13 is an embodiment of a screen shot of a Web page of the present invention showing batch claim data for one of the participants listed in FIG. 12.

As shown in FIG. 13, the batch record may include information pertaining to the invoices for the claimed transactions such as the invoice number, the invoice date and the number and SKU for product rewards claimed. If a debit card is utilized for providing the participants with their rewards, then the batch Web page may also indicate whether the amount has been credited to the card.

Figure 14:
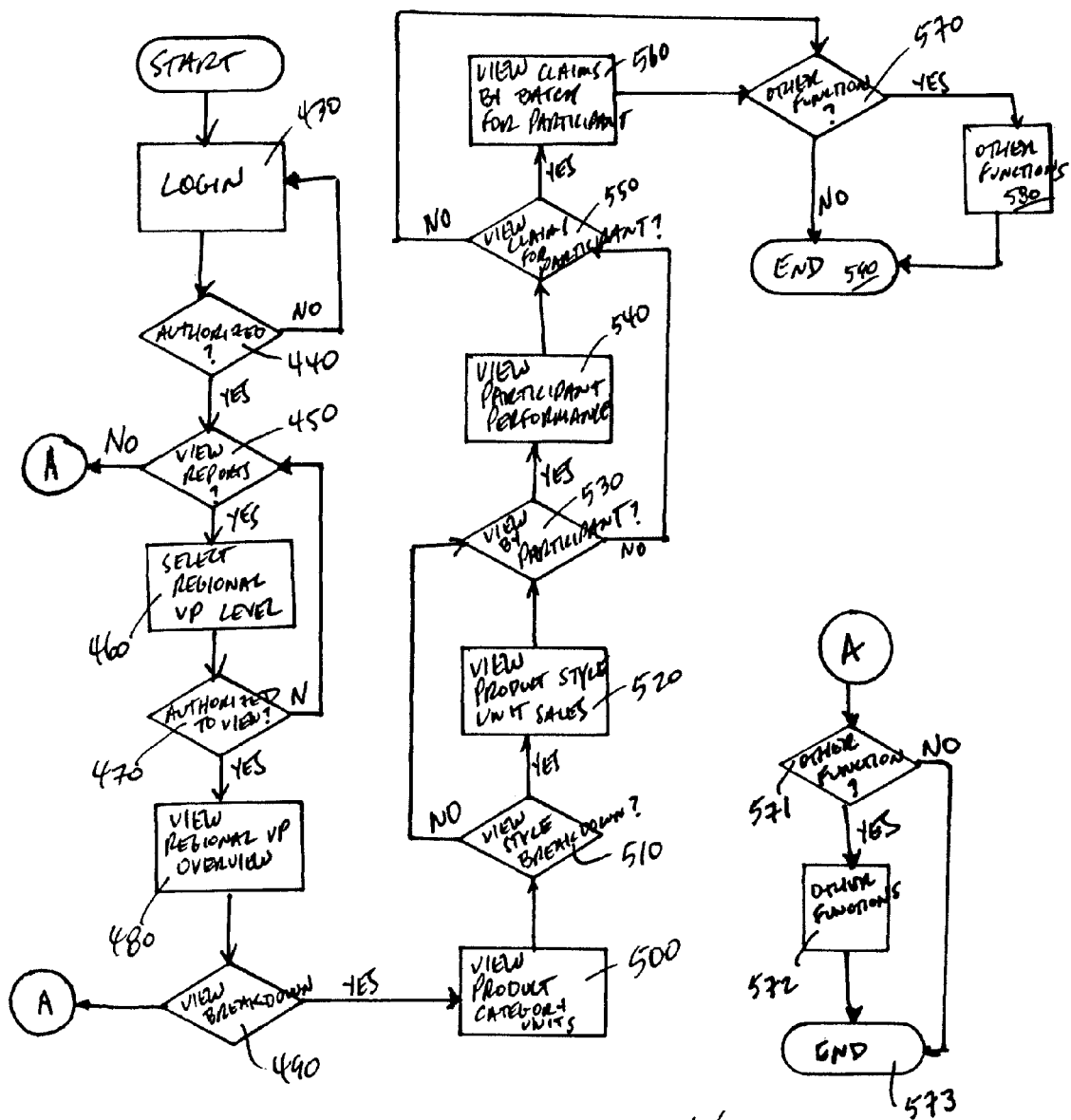
FIG. 14 is a flow chart depicting the steps involved for a regional vice president to view the regional vice president hierarchical reports.

FIG. 14 details the steps involved for a regional vice president to access the hierarchical reports for the regional vice president level. A participant, such as a regional vice president, in an incentive program will log on to the incentive program in step 430. Upon determining whether the participant is authorized to view the incentive program in step 440, the incentive program will display a screen listing the available hierarchical reports in step 450. The participant may then select the vice president hierarchical level in step 460. Once it is determined that the participant is authorized to view the hierarchical level in step 470 (e.g., a regional vice a president), the participant may view the hierarchical report in step 480. If it is determined that the participant is not authorized to view the selected hierarchical level, the user will be prompted to select another level in step 450. If viewing reports is not selected at step 450, then other functions are available at step 571. If no other functions are selected, then the user may exit the program at step 573.

If the regional vice president would like to see the unit details for a regional vice president, the regional vice president may click on the units details link for the regional vice president in step 490 and view the product category units in step 500. The regional vice president may then click on a particular product category in step 510 to view the product style unit sales in step 520. The regional vice president may also view reports for the participants in step 530 to view the performance records for one or more participants in step 540. If the regional vice president desires to view the claims for a participant in step 550, the regional vice president may select a participant to view claims by batch for that participant in step 560. The regional vice president may also elect to perform other functions in step 570, such as viewing other hierarchical reports as described in more detail below. On the other hand, if the regional vice president does not want to perform any additional functions in step 580, then the regional vice president may log off in step 590, thereby ending the connection to the incentive program.

The regional vice presidents may also view different levels of the hierarchical structure beneath them. For example, clicking on the Regional Vice President for the Western Region hypertext link will provide a report, as shown in FIG. 15, of the incentive program results for each of the district managers in the western region. The report for the district managers will preferably include the same information as the regional vice president report, including the units sold, amount claimed, registrants, active participants, 'unit details' hypertext link and 'participants' hypertext link for accessing all of the participants under the individual district manager. The regional vice presidents are thus able to review and compare the productivity of each of the district managers under their realm of responsibility.

The regional vice president may further view the reports for the lower levels of the hierarchical structure by clicking on a hypertext link associated with a particular district manager. For example, clicking on the Rocky Mountain District Manager will provide the regional vice president with a report, such as the report shown in FIG. 16, of each of the territory managers in the Rocky Mountain district. For each territory manager, the report preferably includes the units sold, the claimed amounts, the number of registrants, the number of active participants, a hypertext link to access the unit details, and a hypertext link to access a report of the participants under a particular territory manager.

Figure 17:
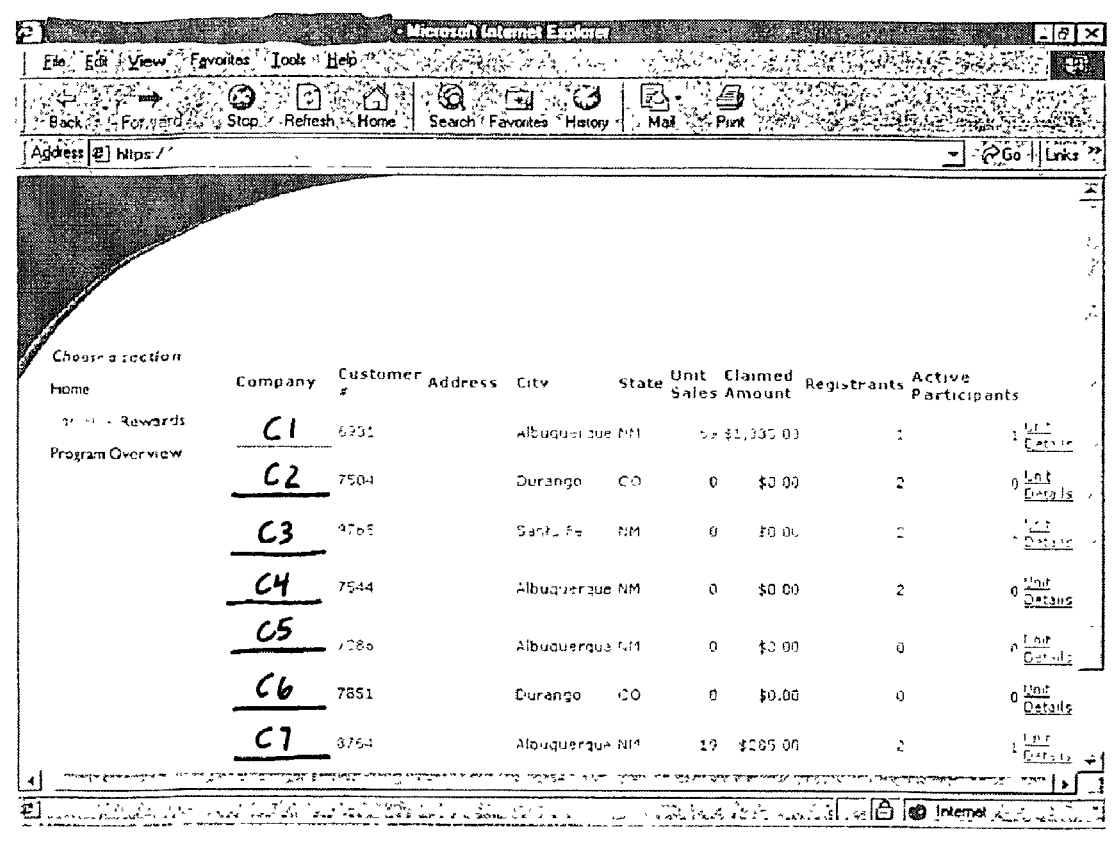
Figure 18:
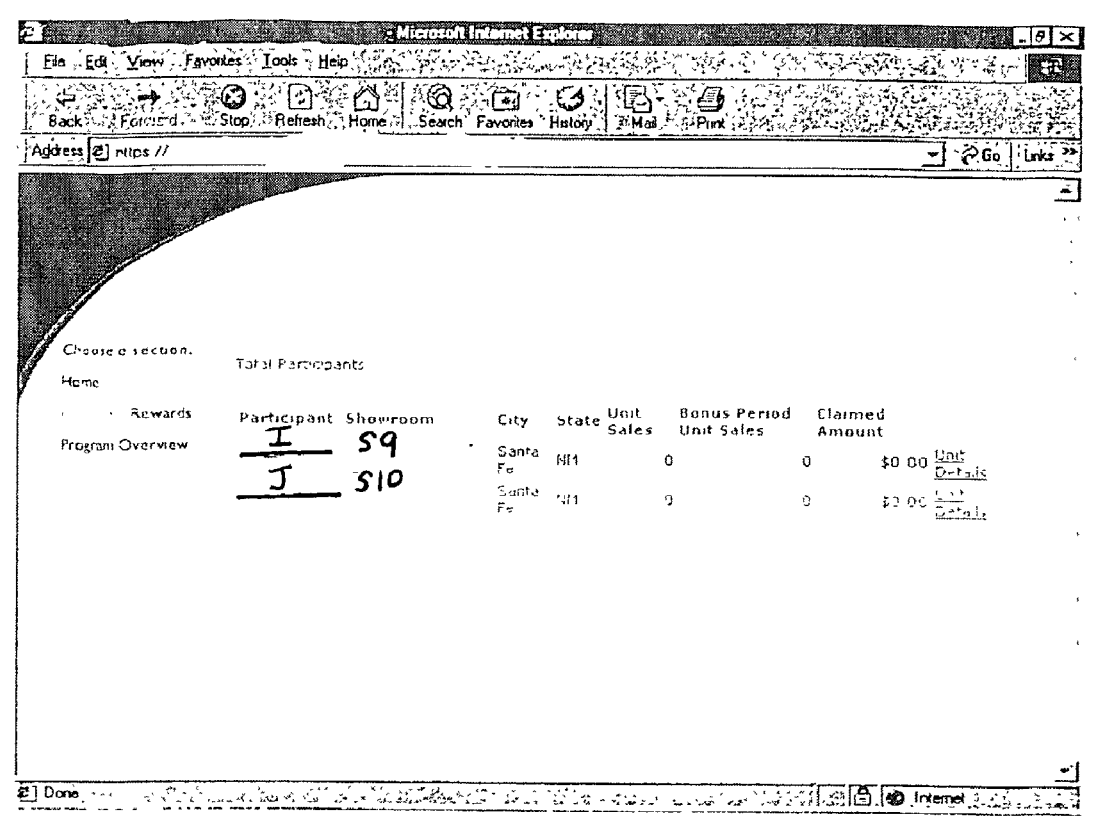

For example, clicking on the first New Mexico/El Paso territory district, which lists nine registrants and three active participants, will lead to a Web page such as the one shown in FIG. 17 for the companies under the particular territory manager. The report may include information such as the company name, customer number, customer address, the units sold, the claimed amount, the number of registrants, the number of active participants and a hypertext link to access information about the unit details. The company can be either the customers who purchased the product that generated the sales for the participant (e.g., salesperson) or the division or affiliate which is supplying the product sold. Clicking on a particular company hypertext link will display a Web page report as shown in FIG. 18 for the individual participants and their respective showrooms. Additionally, the report may include the showrooms' addresses, the units sold, the amount claimed and a hypertext link to access information on the unit details.

Figure 19:
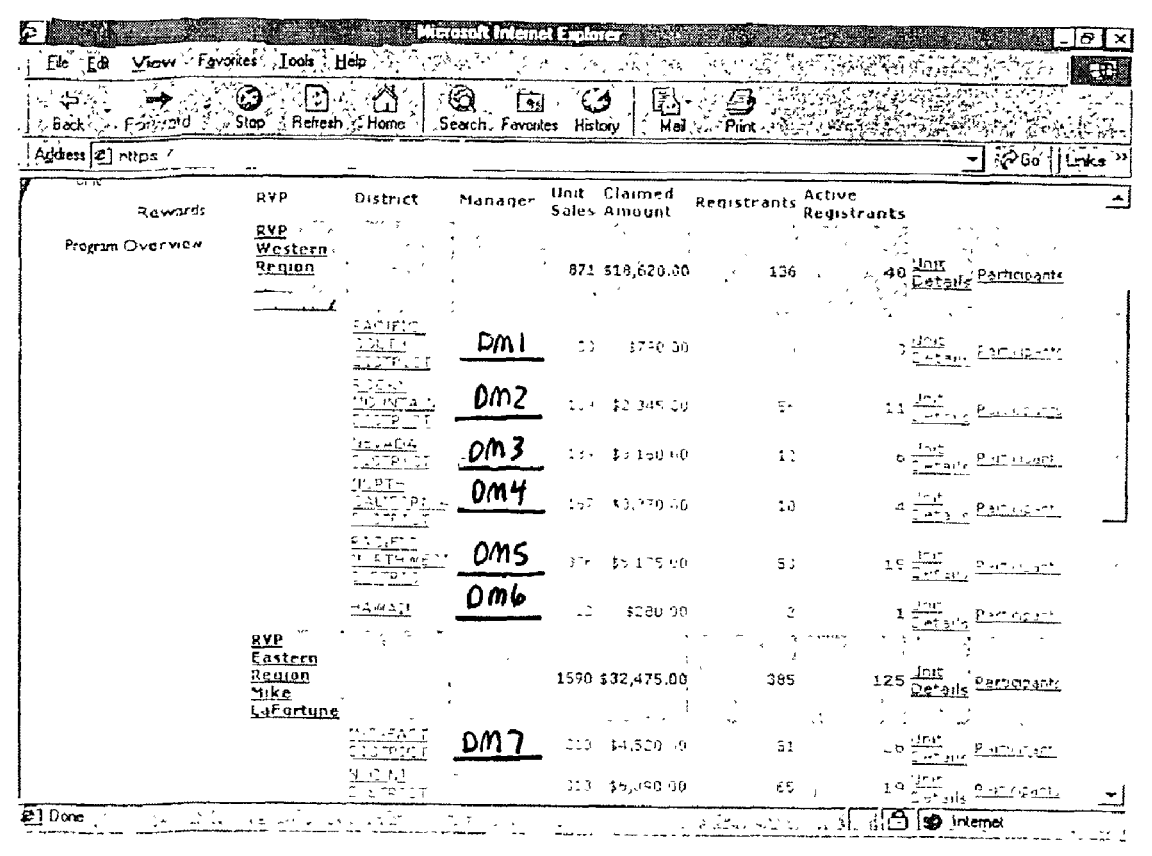

Referring again to FIG. 8, if a regional vice president, or a district manager, would like to access reports for the incentive program for any or all of the district managers, the regional vice president, district manager, or any other party who is authorized to view the district manager hierarchical level, may then click on the district manager hypertext link to access a report for all of the district managers. As shown in FIG. 19, the report of the district managers is preferably displayed by grouping under their respective regional vice president. The report provides a summary of the district managers' current results for the incentive program. In particular, the report may include the total units sold, claimed amount, registrants, active participants and hypertext links to access information about the unit details or participants for each regional vice president and individual district manager. A user may then access information pertaining to the individual district managers or may view summary for the different hierarchical levels under a particular district manager in the same way as explained above.

Figure 20:
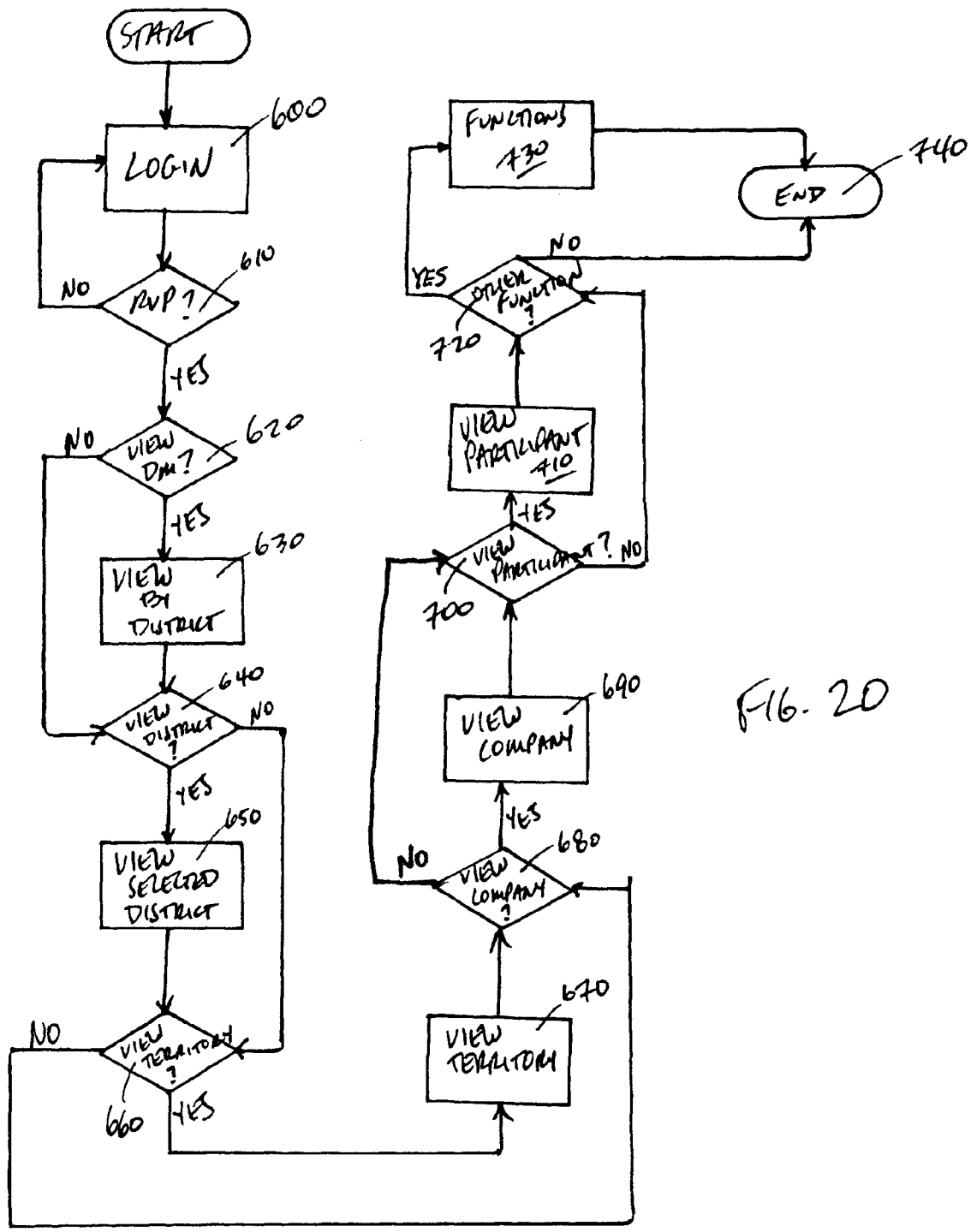
FIG. 20 is a flow chart of the steps involved for a regional vice president to view the hierarchical reports for the district managers, territory managers, companies, and or participants.

FIG. 20 details the steps involved for a regional vice president to access the hierarchical reports for any of the hierarchical levels beneath the regional vice president hierarchical level. A participant, such as a regional vice president or district manager, in an incentive program will log on to the incentive program in step 600. Upon determining whether the participant is authorized to view the incentive program in steps 610, the incentive program will display a screen listing the available hierarchical reports. The participant may then elect to view hierarchical reports for the district managers, territory managers, companies and/or participants in steps 620, 660, 680 or 700.

For example if the regional vice president elects to access the district managers hierarchical report in steps 620, the hierarchical report for all of the district managers may then be viewed in step 630. The regional vice president may thereafter select and view a particular district in steps 640 and 650. The participant may then view the hierarchical reports for the companies and participants under a particular territory manager in steps 660 through 730 as described elsewhere in this application.

The participant may also elect to view the hierarchical reports for all of the territory managers by initially selecting the territory managers in step 660. Upon viewing the report for all of the territory managers in step 670, the participant may elect to view the reports for the companies and participants under a particular territory manager in steps 680 through 710.

Instead of viewing reports for companies under a particular territory manager, the participant may also initially elect to view the hierarchical reports for all the companies in step 680. Upon viewing the report for all of the companies in step 690, the participant may elect to view the reports for participants under a particular company in step 700.

Similarly, the participant may also initially elect to view the hierarchical reports for all of the participants in the incentive program in steps 700 and 710. Upon viewing the participants directly or for a particular district manager or territory manager, the participant may elect to view the claims for the participant as described elsewhere in this application.

The participant may also elect to perform other functions in step 720, such as viewing other hierarchical reports. On the other hand, if the regional vice president does not want to perform any additional functions in step 730, then the regional vice president may log off in step 740, thereby ending the connection to the incentive program.

Figure 21B:
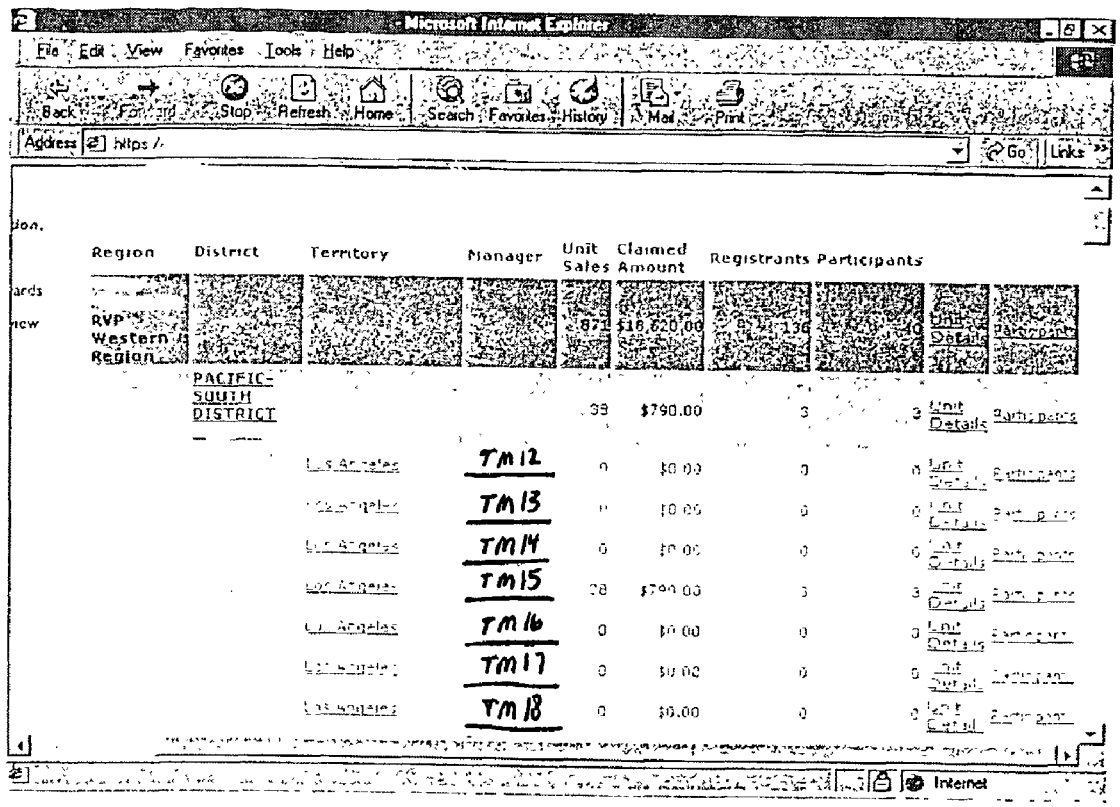
FIG. 21B is an embodiment of a screen shot of a Web page of the present invention depicting a listing of the territory managers participating in the incentive program.

As shown in FIGS. 21A and 21B, an authorized user (e.g., a regional vice president, district manager or territory manager) may also access incentive program reports concerning the individual territory managers by selecting the territory managers' hypertext link in FIG. 8. Selecting the territory managers' link will allow the user to access a report detailing the current results of the incentive program. Such details may include the number of units sold, claimed amount, registrants and active participants for each of the territory managers. Other such forms of information can also be custom-designed for the program. The territory managers are preferably displayed under the hierarchical format showing the regional vice president and district manager to whom the territory managers report. If the user is authorized to view information pertaining to the regional vice presidents and/or district managers, the user may click on the respective hypertext links to access information pertaining to those employees. Otherwise, the user may access information pertaining to the individual territory managers or may view reports for the different hierarchical levels under a particular territory manager in the same way as explained above.

Figure 22:
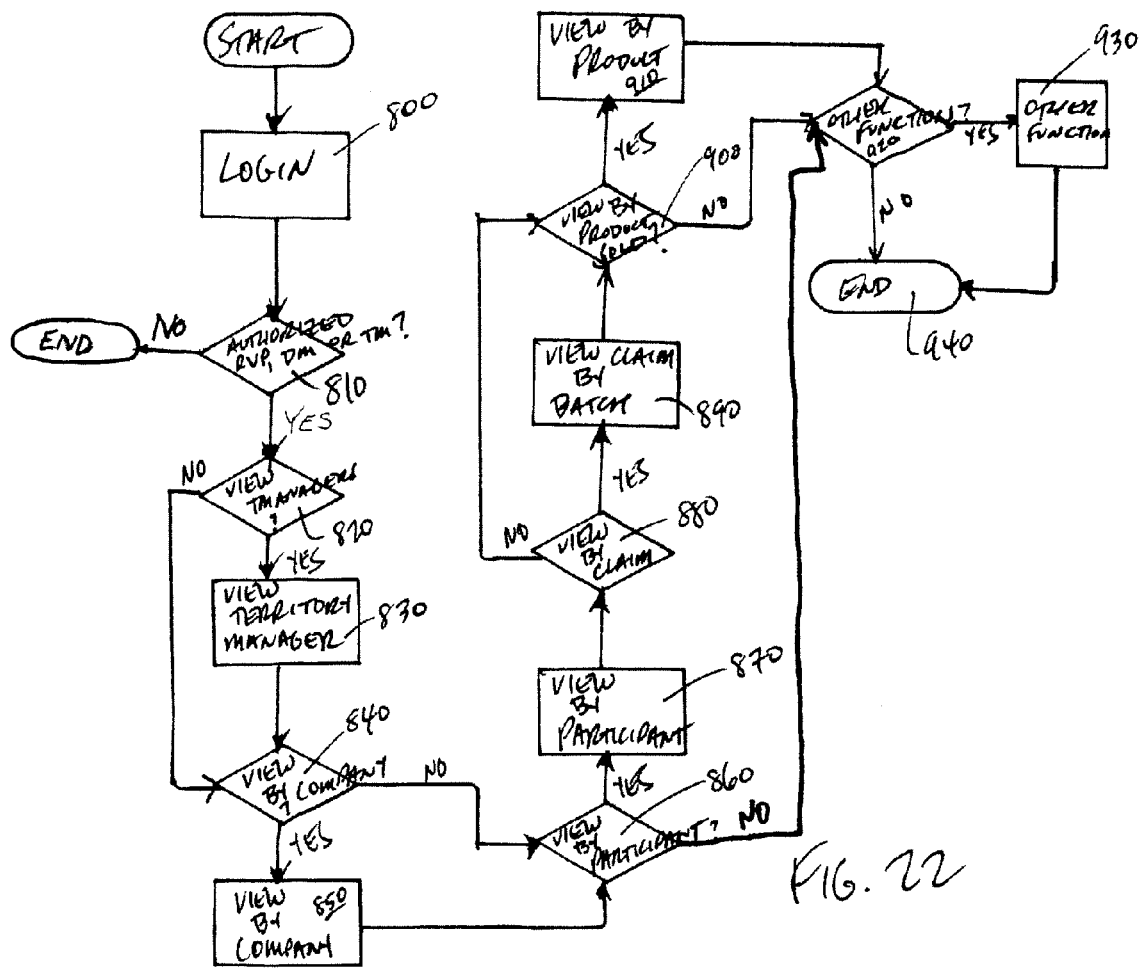
FIG. 22 is a flow chart depicting the steps involved for an authorized participant to view the hierarchical reports for the territory managers, companies and/or participants.

FIG. 22 details the steps involved for a regional vice president, district manager or territory manager to access the hierarchical reports for the territory managers, companies and/or participants. An authorized participant (e.g., a regional vice president, district manager or territory manager) in an incentive program will log on to the incentive program in step 800. Upon determining whether the participant is authorized to view the incentive program in steps 810, the incentive program will display a screen listing the available hierarchical reports. The participant may then elect to view hierarchical reports for the territory managers, the companies and/or the participants in steps 820, 840 and 860. If the participant elects to access the territory manager report in step 820, the participant may view the report in step 840. The participant may then view the hierarchical reports for the companies and participants under a particular territory manager in steps 840 through 910.

Instead of viewing reports for companies under a particular territory manager, the participant may also initially elect to view the hierarchical reports for all the companies in step 840. Upon viewing the report for all of the companies in step 850, the participant may elect to view the reports for participants under a particular company in step 860.

Similarly, the participant may also initially elect to view the hierarchical reports for all of the participants in the incentive program in steps 860 and 870. Upon viewing the participants directly or for a particular district manager or territory manager, the participant may elect to view the claims for the participant in step 880 or the unit details (e.g., products sold) in steps 900 and 910. If the participant elects to view the claims in step 880, the participant may view the claims by batch in step 890.

The participant may also elect to perform other functions in step 920, such as viewing other hierarchical reports. On the other hand, if the regional vice president does not want to perform any additional functions in step 930, then the regional vice president may log off in step 940, thereby ending the connection to the incentive program.

Figure 23:
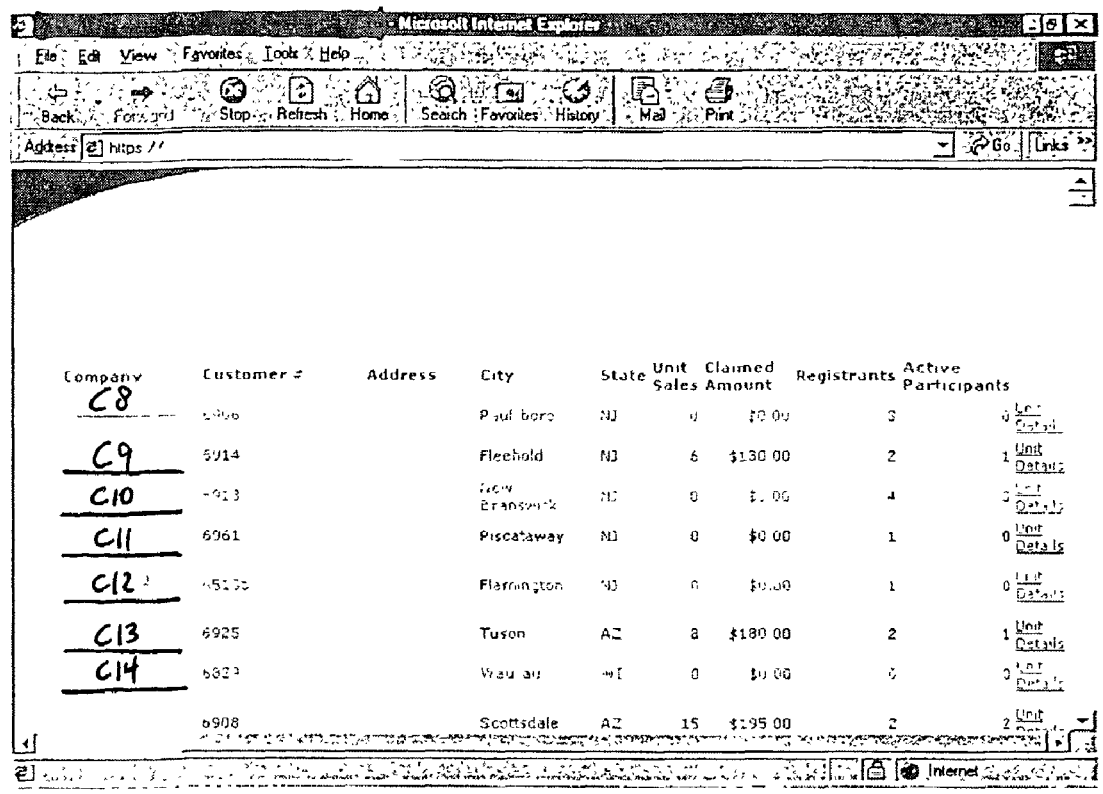
FIG. 23 is an embodiment of a screen shot of a Web page of the present invention that shows a list of the showrooms or companies participating in the incentive program.

The user may also, if authorized, access a current report of the incentive program for the showrooms of a company by clicking on the associated hypertext link. The report preferably includes, as shown in FIG. 23, the company or showroom, customer number, address, units sold, amount claimed, registrants, active participants and a hypertext link to access information on the units sold. Additionally, the user may view the participants associated with the company or showroom by clicking on a hypertext link for the company.

Figure 24:
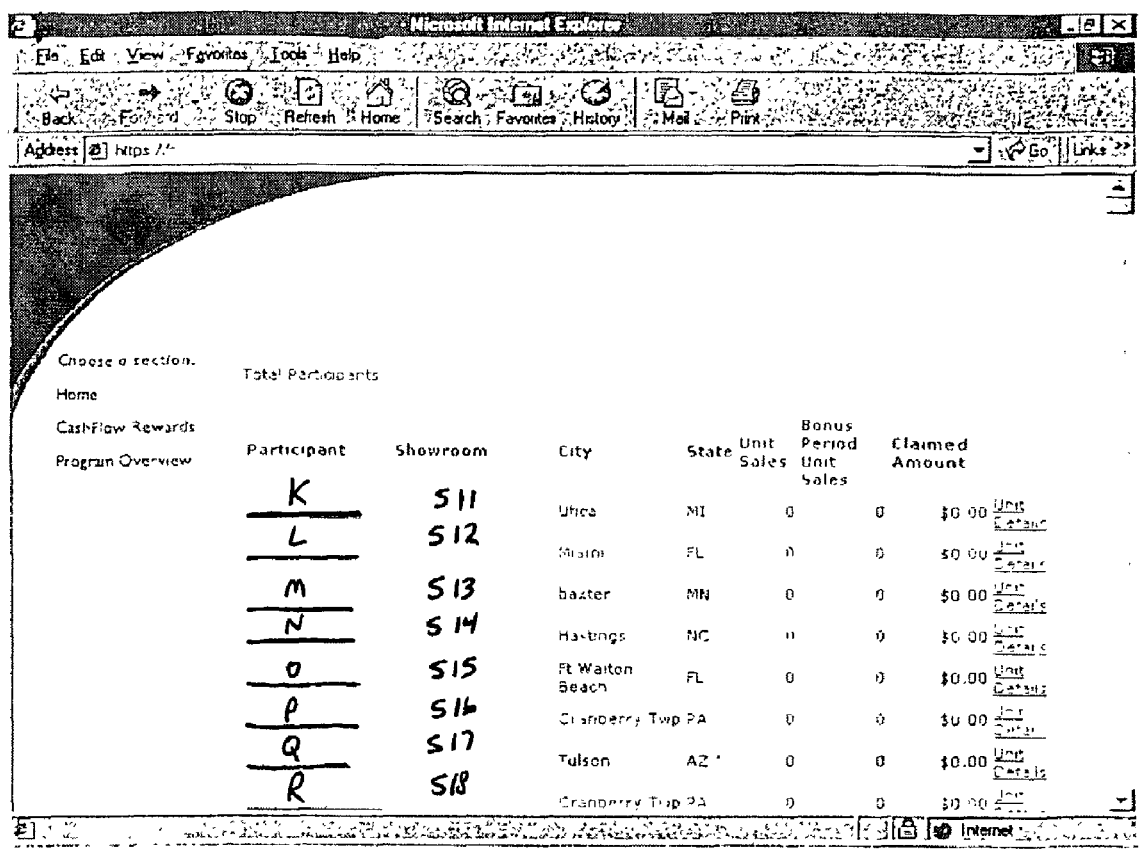
FIG. 24 is an embodiment of a screen shot of a Web page of the present invention showing a list of the individual participants participating in the incentive program.

In addition to viewing the hierarchical levels, an authorized user may also access a current report as shown in FIG. 24 of all of the participants in the program. The report preferably includes the same information as detailed above such as the participants' showrooms' names and locations, the units sold and the amount claimed.

Figure 25:
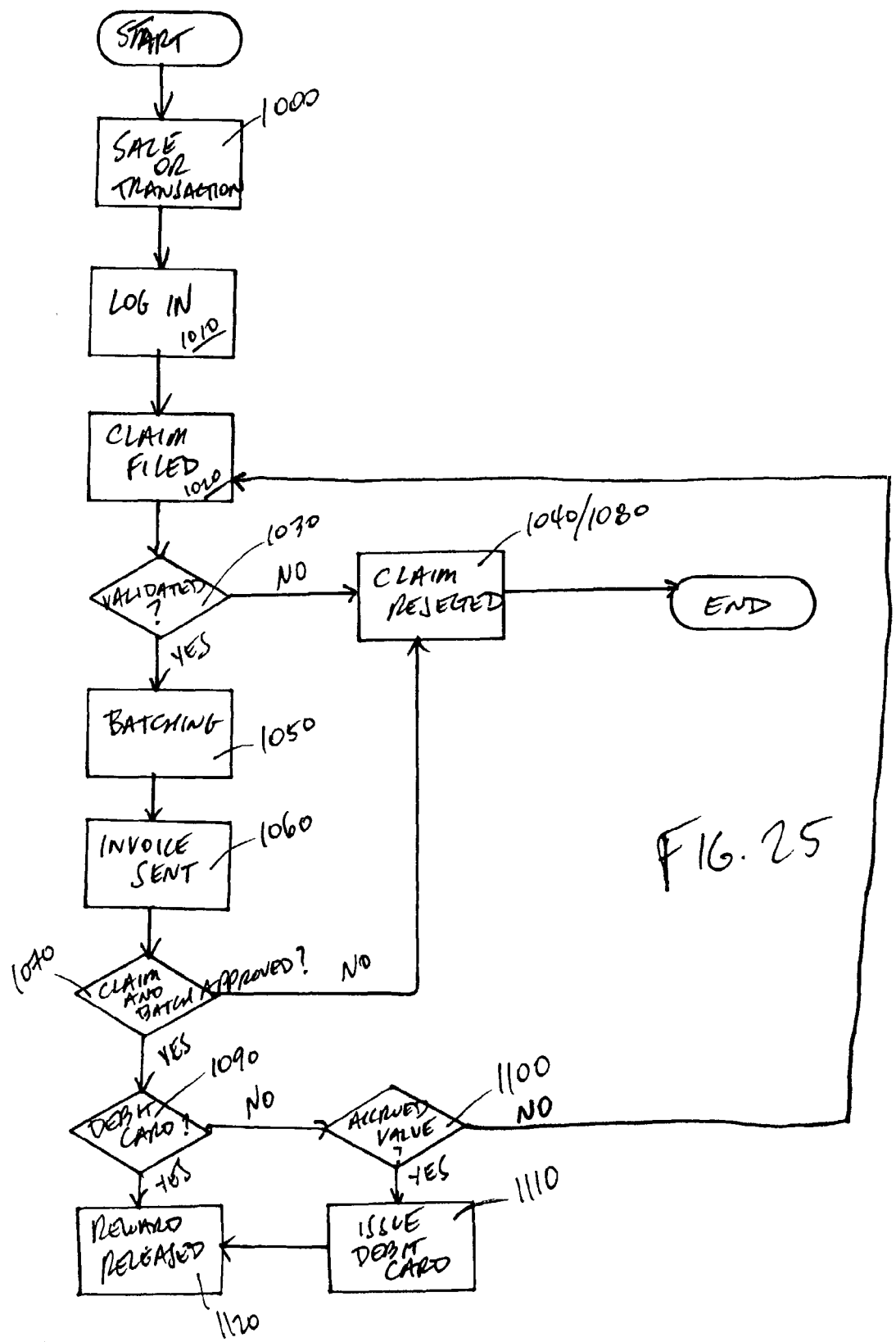
FIG. 25 is a flow chart depicting the steps for inputting and receiving an incentive reward.
Figure 26:
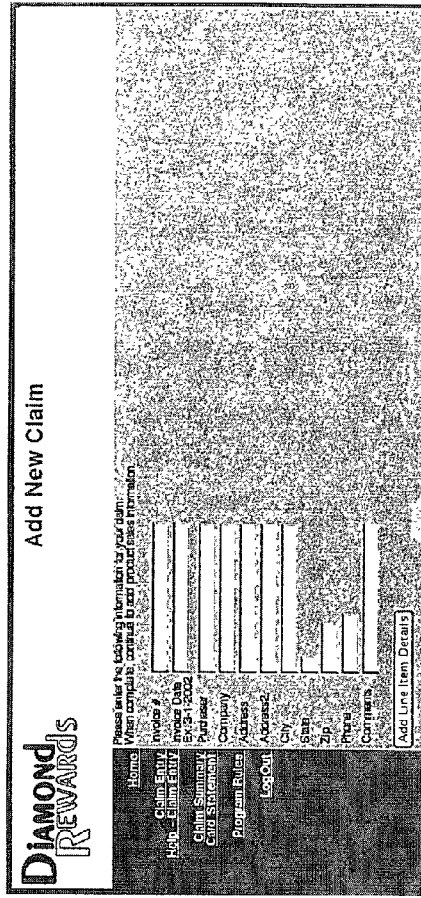
FIG. 26 is an embodiment of screen shot including a Web page of the present invention illustrating a series of data field entries for filing a claim.
Figure 27:
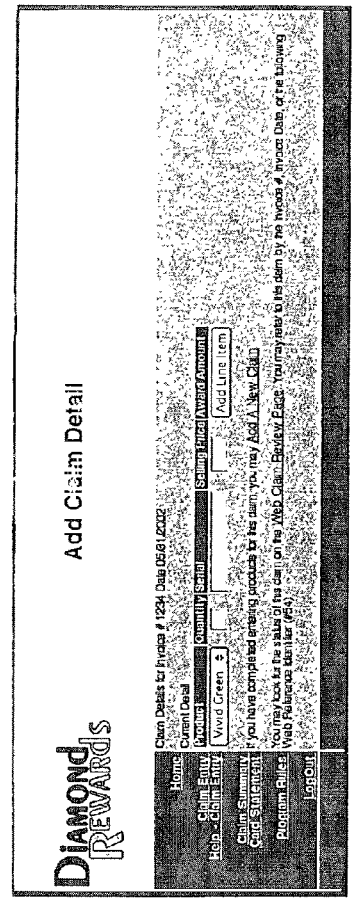
FIG. 27 is an embodiment of a screen shot including a Web page of the present invention that depicts data entry fields for inputting details about the products involved for a filed claim.

Referring now to FIG. 25, the steps involved in submitting a claim and receiving a reward are shown. Upon completion of a transaction that qualifies for a reward under the incentive program in step 1000, a user will log into the incentive program in step 1010 and file a claim in step 1020 for a reward. Once the user logs in, the system preferably recognizes the user and identifies the user with a particular company and compensation level. While the claim may be submitted in any known way, it is preferred that the claim be submitted online. An example of a Web page that enables the user to input information pertaining to the claim in data entry fields is shown in FIG. 26. Information that may be inputted includes, but is not limited to, the invoice number, the invoice date, the purchaser, the company and address and a phone number. The user may also input specific information related to the qualifying products. Data entry fields pertaining to the qualifying products may be included on the new claim Web page, or it may be accessed through a hypertext link or button from the new claim Web page, as shown in FIGS. 26 and 27. While a Web page having data entry fields to allow a user to input individual claims is shown, it is appreciated that data regarding individual or multiple claims may be imported and converted in a known way, if necessary, into the proper format for displaying on the system.

Upon receiving the claim, the system or incentive program institute will review the claim in step 1030 in order to determine whether it is a valid claim under the incentive program. While the step of validating the claim may be done in a variety of ways, including, but not limited to, obtaining a copy of the actual invoices pertaining to the claims, it is preferred that the claims be validated through the use of validation criteria. For example, the system may be set up to store information pertaining to prior claims, such as the serial numbers for the products and the invoice numbers in a database. Information inputted to claim a reward is then compared with the information stored in the database. The system may also be set up with ranges for the particular information, such as limiting the serial number to numbers between SN1000 and SN1100. If any of the inputted information is duplicative of the information stored in the database or falls outside the prescribed range for the information, the claim will be rejected in step 1040.

After the claim is validated, the claim will be batched according to the company's instructions in step 1050. For example, the company may set a certain level that must be obtained before the company is invoiced in step 1060. Once the claims accrue to the set amount, the batch will be closed off to any new claims, proofed for accuracy and then invoiced to the client for its approval in steps 1060 & 1070. While it is shown and disclosed to have the claims batched until a set amount is accrued, it is appreciated that the rewards may be immediately credited to the card upon validation and/or approval by the company.

If the company does not approve the invoice or particular claim, the claim will be rejected in step 1080. On the other hand, if the company approves the invoice, the system will acknowledge that the reward has been approved and will check to see if the participant has a debit card in step 1090. If the participant does not have a debit card, the system will calculate how much the participant has accrued in rewards in step 1100 to determine whether the participant has met the prescribed limit for being issued a card. If the participant has not met the prescribed limit, then the participant may continue to file claims in step 1020. On the other hand, if the participant has accrued the requisite amount of rewards, then a debit card will be issued in step 1110. Upon issuance of the debit card, or if the participant already has a debit card, the institution will notify the bank or other financial institution to credit the debit card in step 1120.

Referring now to FIGS. 28 through 30, the system preferably allows participants to check their claim status and debit card statement online. FIG. 28 illustrates a sample Web page that allows users to view their claim summary or card statement. In order to view a specific time frame, the users also may input a window of time (e.g., from one date to another date) in the respective data entry fields and then click the button or hypertext link to view their claim summary or card statement for the particular time frame selected. A sample claim summary is shown in FIG. 29. The claim summary may include information such as the invoice date, the invoice number, the status of the claim (e.g., pending or rejected), the end user or purchaser, the product sold, the amount of the award and the net reward earned by the user.

Referring now to FIG. 30, a sample card statement of purchase history is depicted. Similar to standard credit card statements, the card statement may include information such as the period of time for the card statement, the previous and new balances, and the details about the transactions. Details about the transaction may include, among other things, the date of the transaction, a description of the transaction and the credit or debit amount.

The present system also permits the company or incentive program institution to effectively manage the program by providing various reports and allowing for online inputting and editing of information. For example, the company or institution may categorize claims based on the validation status of the claims. In one embodiment, the claims may be marked as 'normal' if everything appears correct in the claim, as "loose end" if information is missing, as "reject pending"

if the claim is rejected but appealable, and as "reject final" if the claims are rejected and no longer appealable. Additionally, it is appreciated that the program may be self-administered or may be administered by an outside administrator. It is also appreciated that the system may utilize additional identifiers, such as the companies internal employee identification numbers, to permit the companies to log and track their employees and import and export data into and from the system. That way, data exchange can be virtually seamless between the company offering the incentive program and the outside entity that administers the program, in both directions.

In addition to reporting on the status of the incentive program, it is appreciated that animation may be used to represent the performance and ongoing achievement of the participants. For example, varying animated sketches may be displayed based upon on a participant's performance in different product divisions. One embodiment of the animation program is an Olympic Pentathlon Event involving such events as the javelin, high dive, power lifting, high hurdles and pole vault. Depending on the level of achievement in the particular product division, a unique animation may be viewed indicating the participant's progress. Thus, if a participant has obtained a level equivalent to half a desired quota in a product division, the animated character may complete one-half of the hurdles before falling down. As the participant reaches his or her quota for one or more product divisions, the animated character will complete the event and a medal ceremony animation may be played indicating the success of the participant.

It will be understood that modifications and variations may be effected without departing from the scope of the novel concepts of the present invention, but it is understood that this application is limited only by the scope of the appended claims.

The invention claimed is:

1. A method for providing hierarchical reporting for an online incentive program for salespersons, from a plurality of manufacturers and vendors comprising the steps of:

at least one host computer providing a hosted online incentive program related to the sale and marketing of at least one of a product or a service and that is accessible by a plurality of salespersons on at least one salesperson computer, at least two of the plurality of salespersons having different respective hierarchical levels of employment within at least one organization providing the online incentive program;

the at least one host computer listing on the salesperson computer the plurality of salespersons in a hierarchical format having a plurality of hierarchical levels;

the at least one host computer allowing at least one of the plurality of salespersons to select a hierarchical level on a salesperson computer and transmit the selected hierarchical level from the salesperson computer to the host computer via a communications network, wherein the step of allowing at least one of the plurality of salespersons to select a hierarchical level includes the steps of determining the hierarchical level of the salesperson at the host computer and selectively allowing access at the salesperson computer via the communications network to the hierarchical reports based on the hierarchical level of employment of the salesperson within an organization, wherein each salesperson is prohibited from selecting a hierarchical level corresponding to a level of employment within an organization that is higher than their own level of employment within an organization, and is permitted to select a hierarchical level corresponding to their own level of employment and lower within an organization; and the at least one host computer providing the salesperson a hierarchical report for the selected hierarchical level by transmitting the hierarchical report from the host computer to the salesperson computer via the communications network and displaying the hierarchical report on the salesperson computer, the hierarchical report including information for any one or more of all of the salespersons in the selected hierarchical level.

2. The method of claim 1 wherein the step of allowing at least one of the plurality of salespersons to access the online incentive program comprises the step of determining whether the salesperson is eligible to participate in the incentive program at the host computer in response to a request for access received from a salesperson computer via the communications network.

3. The method of claim 2 wherein the step of determining whether the salesperson is eligible to participate in the incentive program comprises the step of having the salesperson input a user name and password into the salesperson computer and transmitting the user name and password to the host computer via the communications network.

4. The method of claim 3 which further comprises the step of permitting the salesperson to register to participate in the incentive program upon validating the user name and password information received at the host computer from the salesperson computer via the communications network.

5. The method of claim 1 wherein the hierarchical reports comprise information transmitted to the salesperson computer from the host computer via the communications network and related to the status of the incentive program.

6. The method of claim 5 wherein the information comprises a summary of qualified transactions under the incentive program and the salespersons for the hierarchical level transmitted to the salesperson computer from the host computer via the communications network.

7. The method of claim 2 which further comprises the step of permitting the salesperson to submit an incentive program claim into the salesperson computer and transmitting the incentive program claim to the host computer via the communications network.

8. The method of claim 7 wherein the step of permitting the salesperson to submit an incentive program claim comprises the steps of:

the at least one host computer allowing the salesperson to file a claim by entering claim information into the salesperson computer and transmitting claim information to the host computer via the communications network;

the at least one host computer validating the claim information received at the host computer over the communication network; and the at least one host computer issuing instructions from the host computer via the communications network to, in turn, issue a reward to the salesperson.

9. The method of claim 8 wherein the step of the at least one host computer issuing reward instructions from the host computer via the communications network to, in turn, issue a reward to the salesperson comprises the steps of:

the at least one host computer issuing a debit card to the salesperson; and the at least one host computer crediting the debit card an amount equal to the reward.

10. The method of claim 9 wherein the step of issuing a debit card to the salesperson comprises issuing the debit card to the salesperson after the salesperson is determined eligible to participate in the program.

11. The method of claim 9 wherein the step of issuing a debit card to the salesperson comprises issuing the debit card to the salesperson after the salesperson has accumulated a certain amount of rewards.

12. The method of claim 7 wherein the claim is posted in the hierarchical reports issued to salesperson computers from the host computer via the communications network substantially upon receipt of the filed claim.

13. The method of claim 8 wherein the program comprises a database storage unit accessible by the host computer of all filed claims and wherein the step of validating the claim comprises the host computer comparing the filed claim received from the salesperson computer via the communications network against the claims stored in the database and accessed by the host computer.

14. The method of claim 1 which further comprises the step of providing an overlay promotion to the plurality of salespersons by storing information indicative of the overlay promotion in a database storage unit accessible by the host computer.

15. The method of claim 14 wherein the step of providing an overlay promotion comprises the step of selectively limiting participation in the overlay promotion by comparing data indicative of individual salespersons against data indicative of qualifications for participation in an overlay promotion at the host computer.

16. The method of claim 1 which further comprises the step of providing a claim summary to at least one of the plurality of salespersons by assembling the claim summary at the host computer and transmitting the claim summary to a salesperson computer via the communications network.

17. The method of claim 1 which further comprises the step of the at least one host computer providing a debit card statement to at least one of the plurality of salespersons by assembling the debit card statement at the host computer and transmitting the debit card statement to a salesperson computer via the communications network.

18. The method of claim 1 which further comprises the step of providing financial reports regarding the incentive program to salespersons by assembling the financial reports at the host computer and transmitting the financial reports to a salesperson computer via the communications network.

19. A method for providing hierarchical reports for an online incentive program for salespersons, from a plurality of manufacturers and vendors comprising the steps of:

at least one host computer providing an hosted online incentive program related to the sale and marketing of at least one of a product or a service and that is accessible by a plurality of salespersons, at least two of the plurality of salespersons having different respective hierarchical levels of employment within at least one organization providing the online incentive program;

the at least one host computer sorting data indicative of each of the plurality of salespersons in a data storage device accessible by host computer into at least a first hierarchical level associated of a first level of employment within an organization and a second hierarchical level indicative of a second level of employment within an organization;

the at least one host computer providing a hierarchical report for the first hierarchical level and a hierarchical report for the second hierarchical level by assembling sorted data indicative of salespersons from the data storage device accessible by the host computer;

the at least one host computer determining the hierarchical level of at least one of the plurality of salespersons by retrieving data indicative of the employment level of salespersons from the data storage device accessibly by the host computer;

the at least one host computer limiting access to the hierarchical reports based on the hierarchical level of the at least one of the plurality of salespersons by limiting the scope of data retrieved from the data storage device by the host computer, wherein a salesperson of the first hierarchical level may of employment is permitted to access hierarchical reports for both the first hierarchical level and the second hierarchical level by receiving hierarchical reports at a salesperson computer transmitted from the host computer via the communications network, and a salesperson of the second hierarchical level may of employment is permitted to access hierarchical reports for only the second hierarchical level by receiving hierarchical reports at a salesperson computer transmitted from the host computer via the communications network.

20. The method of claim 19 wherein the hierarchical reports assembled by the host computer and transmitted to a salesperson computer via the communications network further comprises data indicative of a third hierarchical level associated with a third level of employment within an organization.

21. A method for providing hierarchical reporting for an online incentive program comprising the steps of:

at least one host computer providing an hosted online incentive program related to the sale and marketing of at least one of a product or a service and that is accessible by a plurality of salespersons on at least one salesperson computer, at least two of the plurality of salespersons having different respective hierarchical levels of employment within at least one organization providing the online incentive program;

the at least one host computer listing on the salesperson computer the plurality of salespersons in a hierarchical format having a plurality of hierarchical levels;

the at least one host computer selectively allowing access to the online incentive program to the plurality of salespersons on at least one salesperson computer;

the at least one host computer selectively permitting access to one of the plurality of hierarchical levels on a salesperson computer, wherein the step of selectively permitting access to one of the plurality of hierarchical levels on a salesperson computer includes the steps of determining the hierarchical level of the salesperson at the host computer and selectively allowing access at the salesperson computer via the communications network to the hierarchical reports based on the hierarchical level of the salesperson within an organization, wherein each salesperson is prohibited from selecting a hierarchical level corresponding to a level of employment within an organization that is higher than their own level of employment within an organization, and is permitted to select a hierarchical level corresponding to their own level of employment and lower within an organization;

the at least one host computer providing the salesperson a hierarchical report for the selected hierarchical level by transmitting the hierarchical report from the host computer to the salesperson computer via the communications network and displaying the hierarchical report on the salesperson computer, the hierarchical report including information for any one or more of all of the salespersons in the selected hierarchical level; and the at least one host computer providing means to demonstrate the status of at least one of the salespersons by transmitting status data to the salesperson computer from the host computer via the communications network, and wherein the status data includes a summary of performance of additional salespersons at the same level of employment as the salesperson receiving the status.

22. The method of claim 21 wherein the means to demonstrate the status of the salesperson comprises animation to represent the performance of the salesperson.

23. A system for providing hierarchical reporting for an online incentive program having a plurality of salespersons listed in a hierarchical format having different hierarchical levels corresponding to different levels of employment of the salespersons within at least one organization, the system comprising:

a host computer;
at least one computer for the plurality of salespersons;
means to connect the salesperson computer to the host computer;
means for determining the employment level and, in turn, the hierarchical level of the salesperson;
means for selectively allowing access to the hierarchical reports based on the employment level of the salesperson, wherein salespersons are allowed access to hierarchical reports for a single incentive program encompassing all participating employees at their own employment level and all participating employees employment levels below their own employment level in an organization, and are excluded from access to hierarchical reports encompassing participating employees above their own employment level for the same single incentive program;
means to generate hierarchical reports regarding the salespersons' involvement in the incentive program, the hierarchical report including information for any one or more of all of the salespersons in the selected hierarchical level; and
means to view the hierarchical reports.

24. An on-line incentive program system for at least one company having a plurality of hierarchical levels corresponding to a plurality of levels of employment within at least one company and at least one salesperson, the system comprising:

a host computer having report means and display means operably associated with the host computer;
data storage means operably associated with the host computer containing data regarding the salesperson and the performance of the salesperson in the incentive program;
at least one remote computer capable of interacting with the data storage means to access the salesperson data;
means for determining the salesperson's performance with respect to the incentive program;
means for accessing and updating the salesperson data as the salesperson performance changes over time; and
means for providing and displaying the salesperson performance at a plurality of hierarchical levels, each of the plurality of hierarchical levels being progressively accessible by employees of progressively higher levels of employment within at least one company, and each of the plurality of hierarchical levels encompassing performance data for a plurality of employees at a given level.

25. The on-line incentive program system of claim 24 wherein the hierarchical levels comprise regional managers, district managers, territory managers, companies, salespersons and products.

26. The on-line incentive program system of claim 24 which further comprises means for submitting award claims based upon the salesperson performance under the incentive program.

27. The on-line incentive program system of claim 24 wherein the host computer and the at least one remote computer are connected by the Internet.

28. The on-line incentive program system of claim 24 wherein the host computer and the at least one remote computer are linked by a local access network.

29. The method of claim 1 wherein the step of providing a hierarchical report includes information for any one or more of all salespersons in all hierarchical levels of employment within an organization below the selected hierarchical level.

30. The method of claim 1, wherein the hierarchical report includes at least one horizontal link, the horizontal link permitting a first salesperson to view a report on performance within the online incentive program by a second salesperson at the same hierarchical level of employment within an organization.

31. The method of claim 30, wherein following the horizontal link causes a second report to be presented to the first salesperson that includes a vertical link, the vertical link when followed permitting the first salesperson to view a third report on performance within the online incentive program by a third salesperson, the third salesperson being at a lower hierarchical level of employment within an organization than the first and second salespersons, the third salesperson's performance being a component of the second salesperson's performance but not the first salesperson's performance.

32. The method of claim 1, wherein the hierarchical report includes at least one user-selectable link permitting a salesperson to view data relative to a portion of the online incentive program that is within a realm of responsibility of a salesperson in the online incentive program.

33. The method of claim 32, wherein the data within a realm of responsibility of a salesperson includes data identifying: a) product categories included in a promotion; b) individual products included in a product category; c) units of individual products sold; d) claimed income from products sold; e) number of registrants in the online incentive program; f) number of active salespersons in the online incentive program; and g) identities of registrants in the online incentive program.

34. The method of claim 33, wherein the user-selectable links of the hierarchical report includes: a) user-selectable links between data identifying salespersons related by hierarchy within an organization; b) user-selectable links between salespersons and product categories included in a promotion; and c) user-selectable links between product categories and individual products included in a promotion.

* * * * *

UNITED STATES PATENT AND TRADEMARK OFFICE
CERTIFICATE OF CORRECTION

PATENT NO. : 7,769,629 B1
APPLICATION NO. : 10/252468
DATED : August 3, 2010
INVENTOR(S) : George Kriza and Travis Kriza It is certified that error appears in the above-identified patent and that said Letters Patent is hereby corrected as shown below:

Column 17, Line 51, replace "an" with --a--.

Column 18, Line 32, replace "an" with --a--.

Signed and Sealed this

Thirtieth Day of November, 2010

David J. Kappos
*Director of the United States Patent and Trademark Office*